US010540414B2

(12) United States Patent
Gellis et al.

(10) Patent No.: US 10,540,414 B2
(45) Date of Patent: Jan. 21, 2020

(54) METHOD AND APPARATUS FOR ONLINE GROUP MATCHING

(71) Applicants: Alexander Gellis, Malibu, CA (US); Wendell Brown, Henderson, CA (US)

(72) Inventors: Alexander Gellis, Malibu, CA (US); Wendell Brown, Henderson, CA (US)

( * ) Notice: Subject to any disclaimer, the term of this patent is extended or adjusted under 35 U.S.C. 154(b) by 407 days.

(21) Appl. No.: 15/236,291

(22) Filed: Aug. 12, 2016

(65) Prior Publication Data

US 2017/0046439 A1 Feb. 16, 2017

Related U.S. Application Data

(60) Provisional application No. 62/204,392, filed on Aug. 12, 2015.

(51) Int. Cl.
*G06F 16/9535* (2019.01)
*G06F 16/9537* (2019.01)
*G06Q 50/00* (2012.01)
*G06Q 30/08* (2012.01)

(52) U.S. Cl.
CPC ...... *G06F 16/9535* (2019.01); *G06F 16/9537* (2019.01); *G06Q 30/08* (2013.01); *G06Q 50/01* (2013.01)

(58) Field of Classification Search
CPC ......... G06F 17/30867; G06F 17/30528; G06F 17/30091; G06F 17/30206; G06F 17/30283; G06F 17/30386; G06F 17/30424; G06F 17/30522; G06F 17/30554; G06F 17/30598; G06F 17/30696; G06F 17/30864; G06F 17/30038; G06F 17/30477; G06F 17/30861; G06F 17/3087; G06F 16/9535; G06F 16/285
USPC ........... 705/14.41, 14.53; 707/722, 710, 758, 707/784, 812, 999.003, 999.005; 715/745
See application file for complete search history.

(56) References Cited

U.S. PATENT DOCUMENTS

| | | | | |
|---|---|---|---|---|
| 6,480,885 | B1 * | 11/2002 | Olivier | H04L 12/1859 709/202 |
| 8,738,705 | B2 * | 5/2014 | Kelmenson | G06Q 50/01 709/205 |
| 9,756,372 | B2 * | 9/2017 | Shkedi | G06Q 30/02 |
| 2009/0198666 | A1 * | 8/2009 | Winston | G06Q 50/01 |

(Continued)

*Primary Examiner* — Kris E Mackes
*Assistant Examiner* — Cecile H Vo
(74) *Attorney, Agent, or Firm* — Alston & Bird LLP

(57) ABSTRACT

Provided herein are systems, methods and computer readable media for programmatically performing group matching and facilitating subsequent interaction. An example apparatus may be configured to receive a request event, the request event comprising at least an indication of user profile associated with the first mobile device and an indication of a current personality profile, access a database, utilizing the indication of the user profile and the indication of the current personality profile, to determine at least a first group with which the user profile is associated, access a second database, utilizing information indicative of the first group to identify a set of one or more candidate groups with which to match the first group, select a second group with which to match the first group, transmit information indicative of the second group, receive an indication of a type of feedback, facilitate an interaction with the second group.

21 Claims, 26 Drawing Sheets

(56) References Cited

U.S. PATENT DOCUMENTS

| | | | | |
|---|---|---|---|---|
| 2012/0158851 A1* | 6/2012 | Kelmenson | ............ | G06Q 50/01 709/205 |
| 2013/0254278 A1* | 9/2013 | Buhr | ...................... | G06Q 50/01 709/204 |
| 2013/0254680 A1* | 9/2013 | Buhr | ...................... | A63F 13/61 715/753 |
| 2014/0304277 A1* | 10/2014 | Veugen | .................. | G06Q 30/02 707/748 |

* cited by examiner

METHOD AND APPARATUS FOR ONLINE GROUP MATCHING

CROSS REFERENCE TO RELATED APPLICATIONS

This application claims the benefit of U.S. Provisional Patent Application No. 62/204,392, titled "Method and Apparatus for Online Group Matching," filed Aug. 12, 2015, which is incorporated by reference herein in its entirety.

TECHNOLOGICAL FIELD

Embodiments of the invention relate, generally, to programmatically connecting grouped user devices, and in particular, to facilitating connections between groups of users through their use, for example, of GPS equipped mobile devices.

BACKGROUND

Conventional matching systems use location as derived from GPS latitude/longitude information, wireless network information, mobile cell phone tower information, and/or other similar location data, along with manually entered criteria such as desired age range. Such information is used for example, to connect two user devices of matched users.

The applicant has discovered problems with current methods, systems, and apparatuses for programmatically connecting two user devices in that the applied techniques are unsuitable when matching groups. Through applied effort, ingenuity, and innovation, Applicant has solved many of these identified problems by developing a solution that is embodied by the present invention, which is described in detail below.

BRIEF SUMMARY

Some embodiments may provide for selecting and completing an online messaging session or transaction coupled with a group matching system, and more specifically from a device equipped with location-sensing sensors such as a mobile phone or tablet device. A list of online group-to-group matches that are filtered according to various criteria then ranked (ore presented in a ranked sequence) according to the group's likely interests (or other matching criteria) are then coupled to the output of a personal matching system. Upon confirmation of mutual interest between at least two different people total (at least one person from each matched group), a messaging session or transaction is then presented. In some embodiments, the matching may include matching of groups based on processing user data aggregated from multiple members of a group.

Some embodiments may provide for computing potential matched groups through a mechanism which correlates and filters based on online social or other account information, such as Facebook Likes or interests, Twitter interests (#hashtags), LinkedIn and other similar accounts or networks. For example, a system may be configured to correlate real-time and non-real-time data from a variety of sources, then correlate and rank supplemental information, based in part on a variety of data inputs, as well as historic and other related data.

In general, embodiments of the present invention provided herein include systems, methods, apparatuses, and computer readable media for programmatically performing group matching and facilitating subsequent interaction.

In some embodiments, a group matching system may be provided comprising a group matching apparatus and at least a first instance of a mobile software application installed on a first mobile device, wherein the group matching apparatus comprises at least one processor and at least one memory including computer program code, the at least one memory and the computer program code configured to, with the processor, cause the apparatus to at least receive, via a network from the at least one mobile software application, a request event, the request event comprising at least an indication of user profile associated with the first mobile device and an indication of a current personality profile, access a database, utilizing the indication of the user profile and the indication of the current personality profile, to determine at least a first group with which the user profile is associated, access a second database, utilizing information indicative of the first group to identify a set of one or more candidate groups with which to match the first group, select a second group, the second group being from the set of one or more candidate groups with which to match the first group, transmit information indicative of the second group, receive, via the network from the at least one mobile software application, an indication of a type of feedback input at the mobile device, determine a subsequent action as a function of the type of feedback, wherein determination of the subsequent action comprises accessing a third database, utilizing information indicative of the type of feedback, and receiving instructions to perform the subsequent action, performing the subsequent action, wherein the subsequent action is at least of, in an instance of a first type of feedback, selecting a third group from the set of one or more candidate groups, or in an instance of a second type of feedback, facilitating an interaction with the second group, wherein the at least one mobile software application comprises an interface configured to display a first element identifying the second group, a second elements, the second element being user-selectable and configured to receive input indicative of the feedback wherein the at least one mobile software application comprising computer program code configured to cause the mobile device to display, on the interface, information indicative of a candidate group, receive, from the interface, the input of the feedback, and cause transmission of the indication of the feedback.

In some embodiments, the at least one memory and the computer program code are further configured to, with the processor, cause the apparatus to access the second database to identify information indicative of associated display information, and cause display of the information.

In some embodiments, the at least one memory and the computer program code are further configured to, with the processor, cause the apparatus to log the type of feedback that the candidate group received by updating the group database to associate the type of feedback data with the second group.

In some embodiments, the at least one memory and the computer program code are further configured to, with the processor, cause the apparatus to receive, in conjunction with the indication of the user profile, an indication of a current personality profile, and determine, as function of both the indication of the user profile and the indication of the current personality profile, the at least first group with which the user profile is associated.

In some embodiments, the at least one memory and the computer program code are further configured to, with the processor, cause the apparatus to receive, in conjunction with the indication of the user profile, geolocation data indicating a location of the first mobile device, and transmit, via the network to the mobile software application and in conjunction with information indicative of the second group, geo-skin data configured to be displayed on the interface of the mobile software application and identify the location of the mobile device.

In some embodiments, the at least one memory and the computer program code are further configured to, with the processor, cause the apparatus to determine a current geo-location, of the first group, and select the second group is based on proximity.

In some embodiments, selecting the second group comprises identifying, via a learning model, which subset of groups is relevant at a time of the request, and determining the second group by closest distance.

In some embodiments, a method may be provided for programmatically performing group matching and facilitating subsequent interaction, the method comprising receiving, via a network from an instance of a mobile software application installed on a first mobile device, a request event, the request event comprising at least an indication of user profile associated with the first mobile device, accessing a user-to-group database, utilizing the indication of the user profile, to determine at least a first group with which the user profile is associated, accessing a second database, utilizing information indicative of the first group to identify a set of one or more candidate groups with which to match the first group, selecting a second group, the second group being from the set of one or more candidate groups with which to match the first group, transmitting, via the network to the mobile software application, information indicative of the second group, the information indicative of the second group configured for display, at the first mobile device, of a first element identifying the second group, a second element, the second element being user-selectable and configured to receive input indicative of feedback, receiving, via the network from the mobile software application, an indication of a type of feedback input at the first mobile device, determining a subsequent action as a function of the type of feedback, wherein determination of the subsequent action comprises accessing a third database, utilizing information indicative of the type of feedback, and receiving instructions to perform the subsequent action performing the subsequent action, wherein the subsequent action is at least of, in an instance of a first type of feedback, selecting a third group from the set of one or more candidate groups, or in an instance of a second type of feedback, facilitating an interaction with the second group.

In some embodiments, the method may further comprise accessing the second database to identify information indicative of associated display information (information indicating how the second group likes to be displayed), and causing display of the information.

In some embodiments, the method may further comprise logging the type of feedback that the candidate group received by updating the group database to associate the type of feedback data with the second group.

In some embodiments, the method may further comprise receiving, in conjunction with the indication of the user profile, an indication of a current personality profile, and determining, as function of both the indication of the user profile and the indication of the current personality profile, the at least first group with which the user profile is associated.

In some embodiments, the method may further comprise receiving, in conjunction with the indication of the user profile, geolocation data indicating a location of the first mobile device, and transmitting, via the network to the mobile software application and in conjunction with information indicative of the second group, geo-skin data configured to be displayed on the interface of the mobile software application and identify the location of the mobile device.

In some embodiments, the method may further comprise determining a current geolocation, of the first group, and selecting the second group is based on proximity.

In some embodiments, selecting the second group comprises identifying, via a learning model, which subset of groups is relevant at a time of the request, and determining the second group by closest distance.

In some embodiments, a computer program product may be provided for programmatically performing group matching and facilitating subsequent interaction, the computer program product comprising at least one non-transitory computer-readable storage medium having computer-executable program code instructions stored therein, the computer-executable program code instructions comprising program code instructions for receiving, via a network from an instance of a mobile software application installed on a first mobile device, a request event, the request event comprising at least an indication of user profile associated with the first mobile device, accessing a user-to-group database, utilizing the indication of the user profile, to determine at least a first group with which the user profile is associated, accessing a second database, utilizing information indicative of the first group to identify a set of one or more candidate groups with which to match the first group, selecting a second group, the second group being from the set of one or more candidate groups with which to match the first group, transmitting, via the network to the mobile software application, information indicative of the second group, the information indicative of the second group configured for display, at the first mobile device, of a first element identifying the second group, a second element, the second element being user-selectable and configured to receive input indicative of feedback, receiving, via the network from the mobile software application, an indication of a type of feedback input at the first mobile device, determining a subsequent action as a function of the type of feedback, wherein determination of the subsequent action comprises accessing a third database, utilizing information indicative of the type of feedback, and receiving instructions to perform the subsequent action performing the subsequent action, wherein the subsequent action is at least of, in an instance of a first type of feedback, selecting a third group from the set of one or more candidate groups, or in an instance of a second type of feedback, facilitating an interaction with the second group.

In some embodiments, the computer-executable program code instructions further comprise program code instructions for accessing the second database to identify information indicative of associated display information, and causing display of the information.

In some embodiments, the computer-executable program code instructions further comprise program code instructions for logging the type of feedback that the candidate group received by updating the group database to associate the type of feedback data with the second group.

In some embodiments, receiving, in conjunction with the indication of the user profile, an indication of a current personality profile, and determining, as function of both the indication of the user profile and the indication of the current personality profile, the at least first group with which the user profile is associated.

In some embodiments, the computer-executable program code instructions further comprise program code instructions for receiving, in conjunction with the indication of the user profile, geolocation data indicating a location of the first mobile device, and transmitting, via the network to the mobile software application and in conjunction with information indicative of the second group, geo-skin data configured to be displayed on the interface of the mobile software application and identify the location of the mobile device.

In some embodiments, the computer-executable program code instructions further comprise program code instructions for determining a current geolocation, of the first group, and selecting the second group is based on proximity.

In some embodiments, selecting the second group comprises identifying, via a learning model, which subset of groups is relevant at a time of the request, and determining the second group by closest distance.

Other systems, methods, and features will be, or will become, apparent to one with skill in the art upon examination of the following figures and detailed description. It is intended that all such additional systems, methods, features to be included within this description, be within the scope of the disclosure, and be protected by the following claims.

BRIEF DESCRIPTION OF THE SEVERAL VIEWS OF THE DRAWINGS

Figure 1:
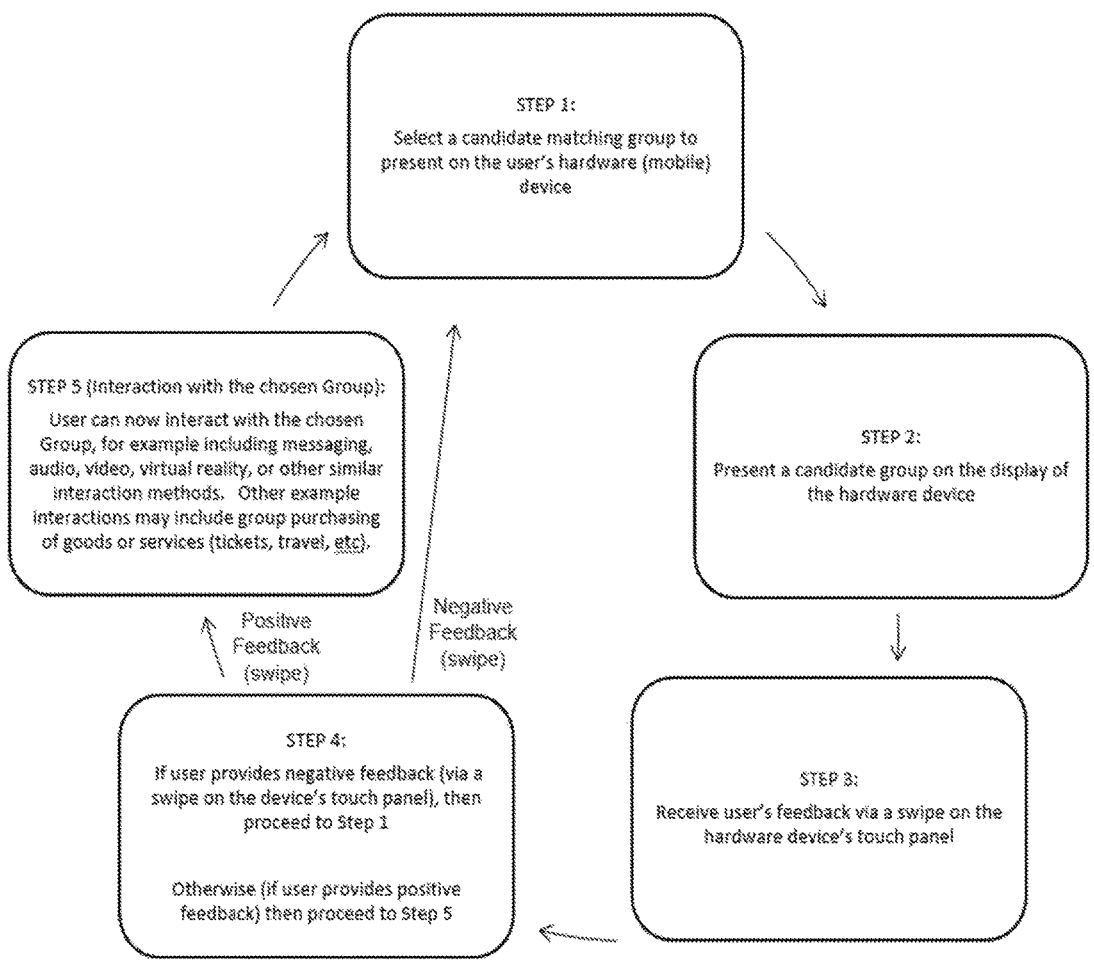
Figure 2:
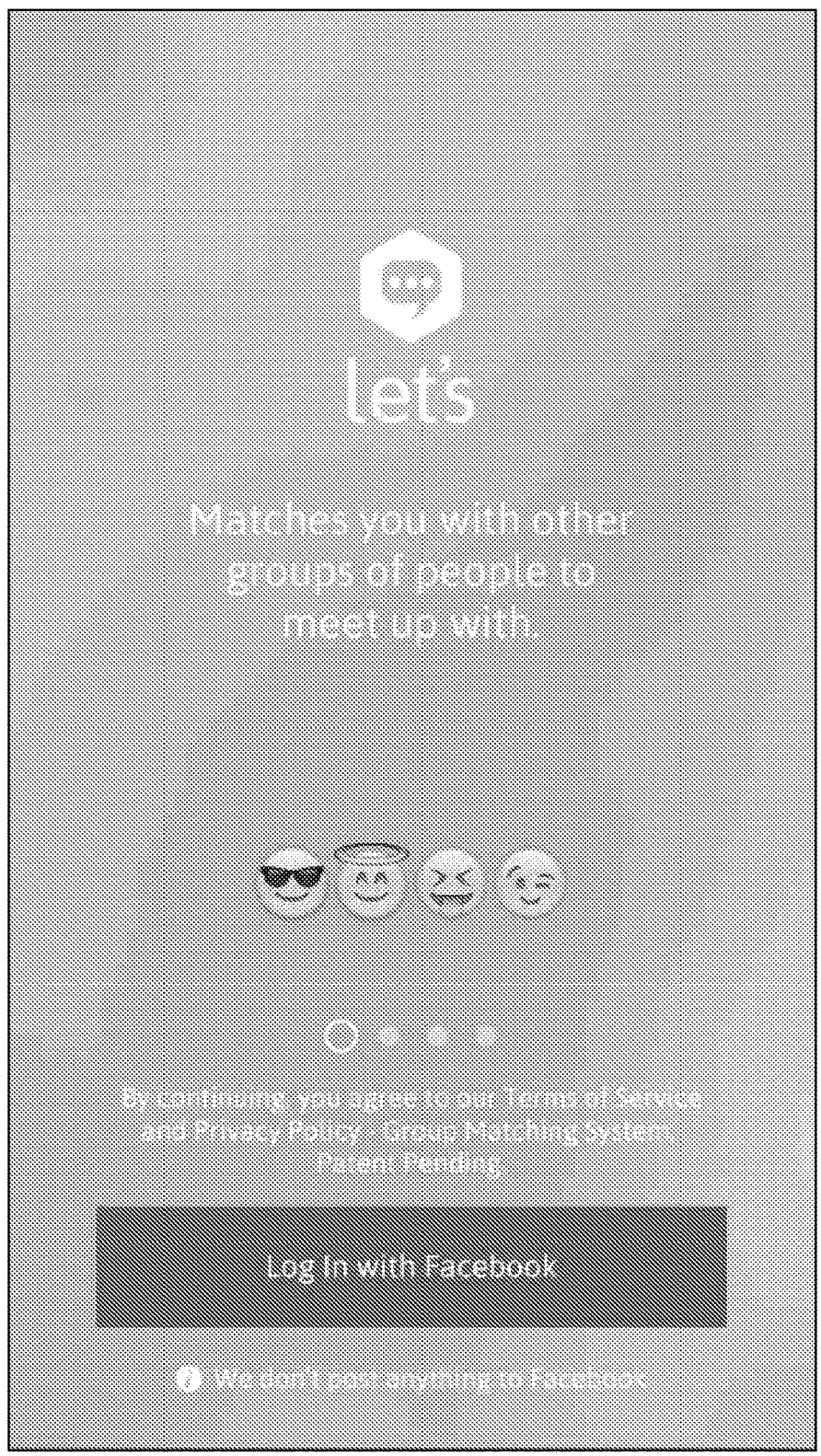
Figure 3:
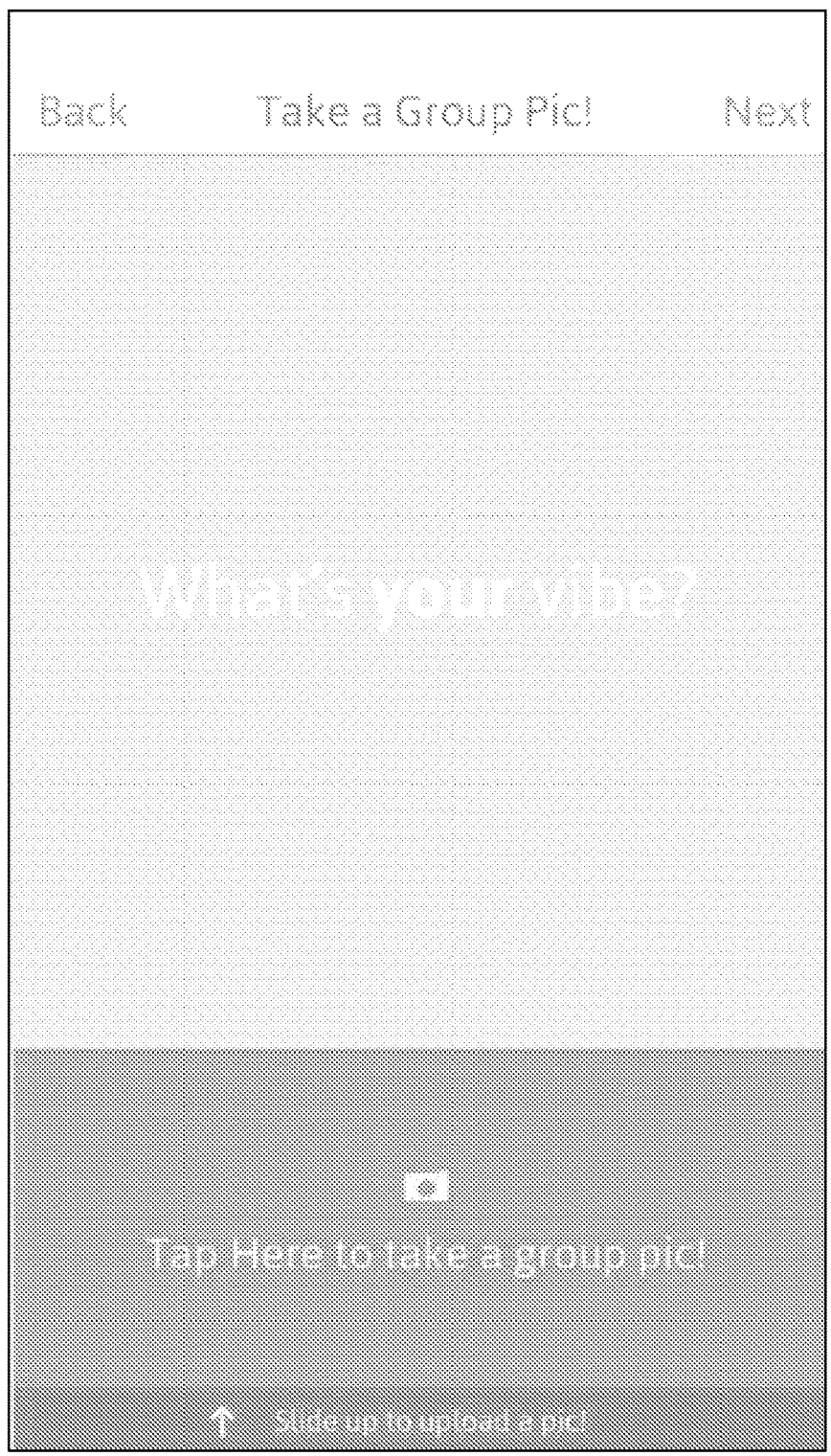
Figure 4:
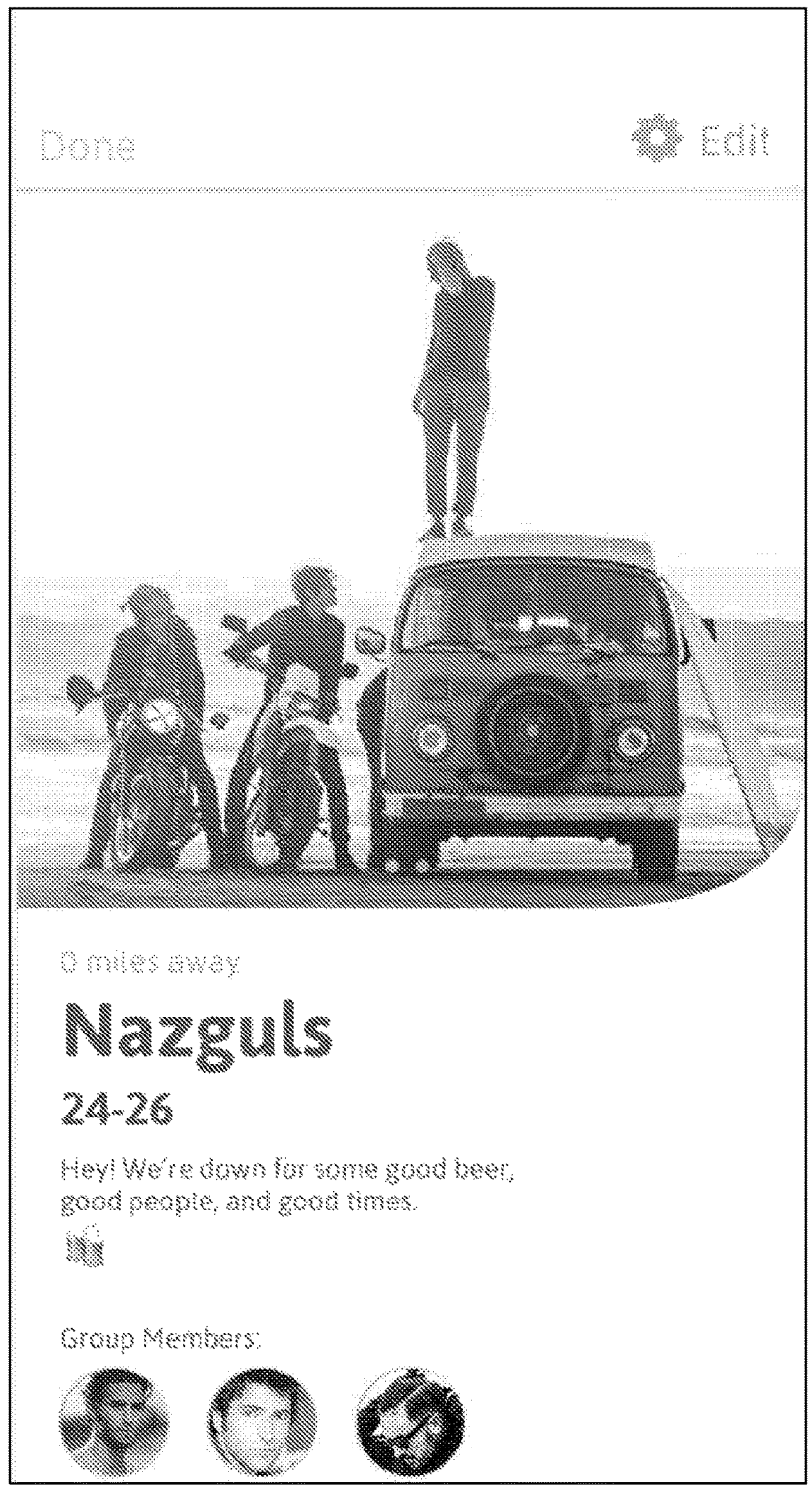
Figure 5:
Figure 6:
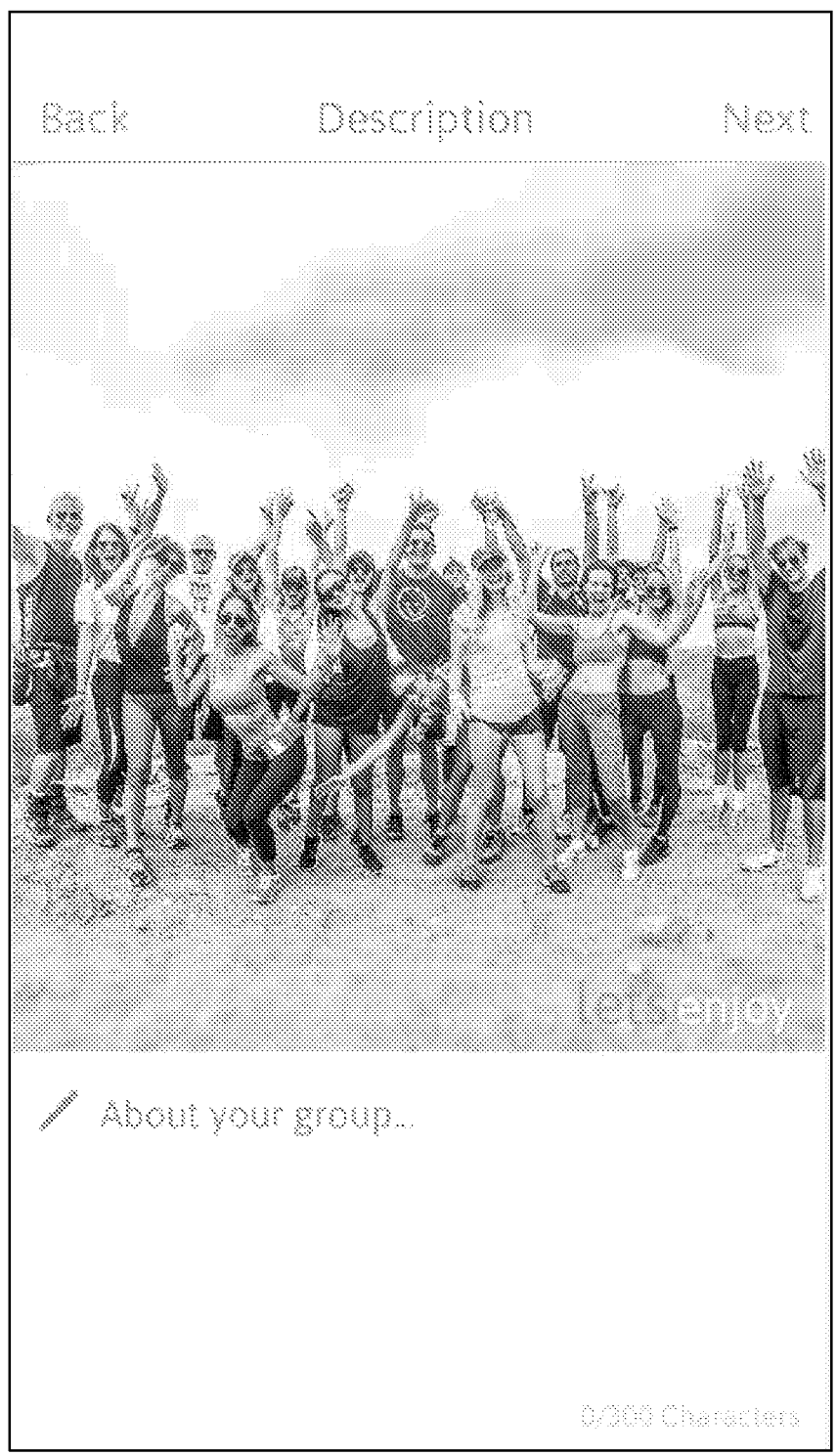
Figure 7:
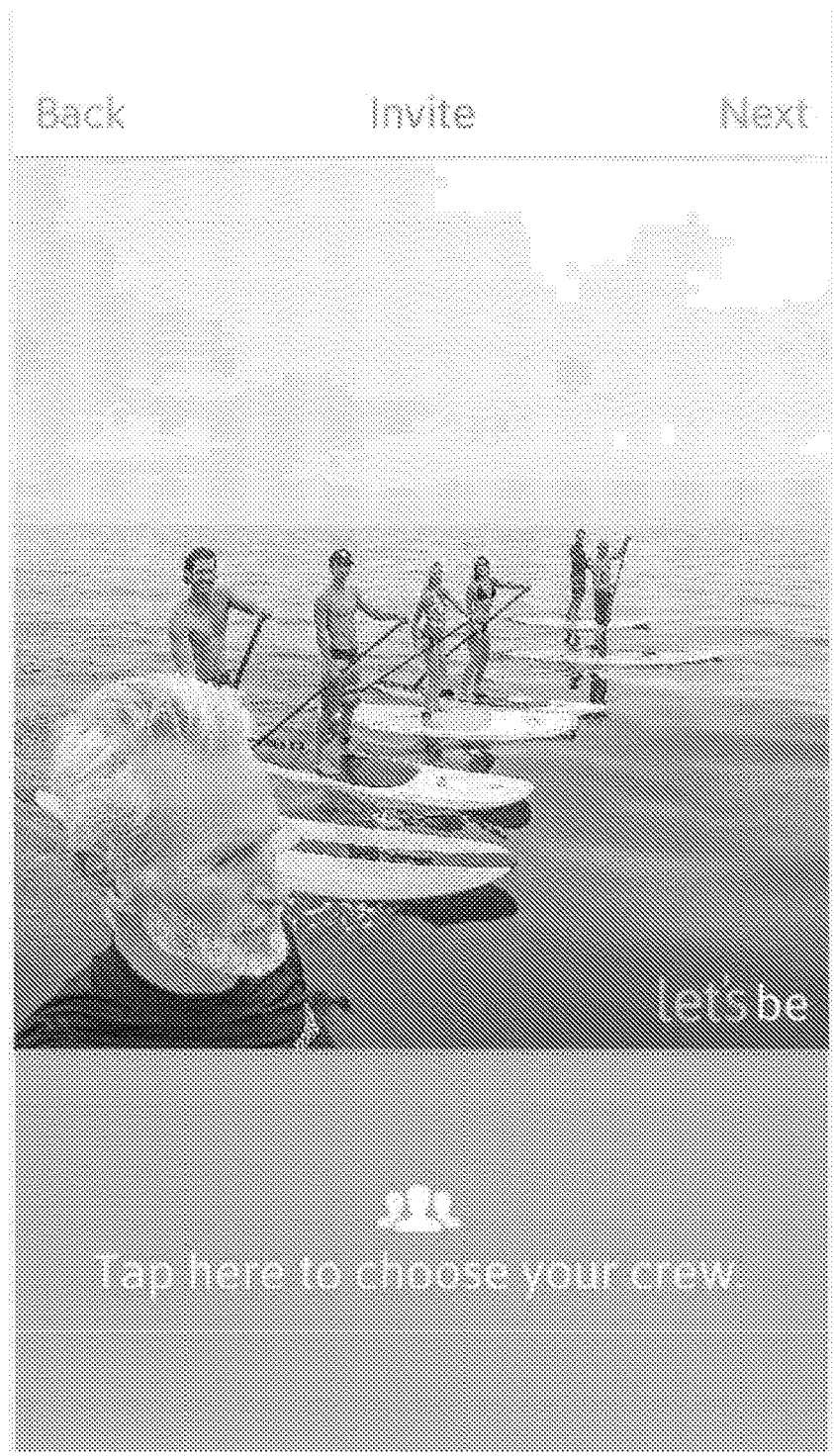

Having thus described embodiments of the invention in general terms, reference will now be made to the accompanying drawings, which are not necessarily drawn to scale, and wherein:

FIG. 1 shows a data flow diagram showing a high-level process that may be implemented in accordance with some embodiments of the present invention.

FIGS. 2-23 show examples of user interfaces that may be presented on a user device, in accordance with some embodiments of the present invention.

Figure 24:
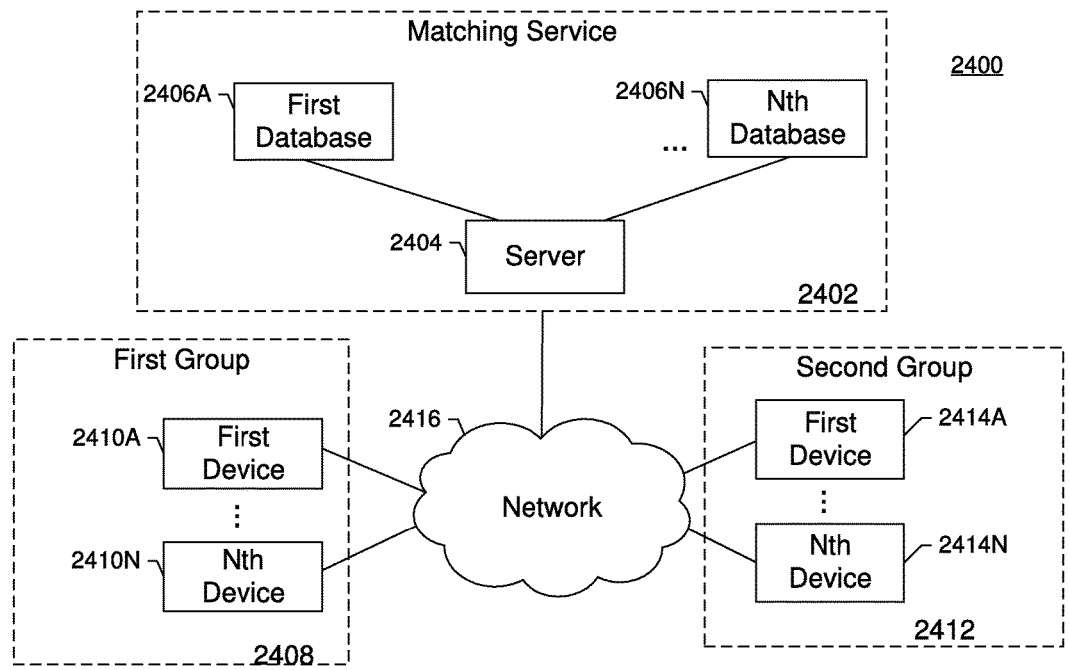

FIG. 24 shows an example of a group matching system that may be utilized in accordance with some exemplary embodiments of the present invention.

Figure 25:
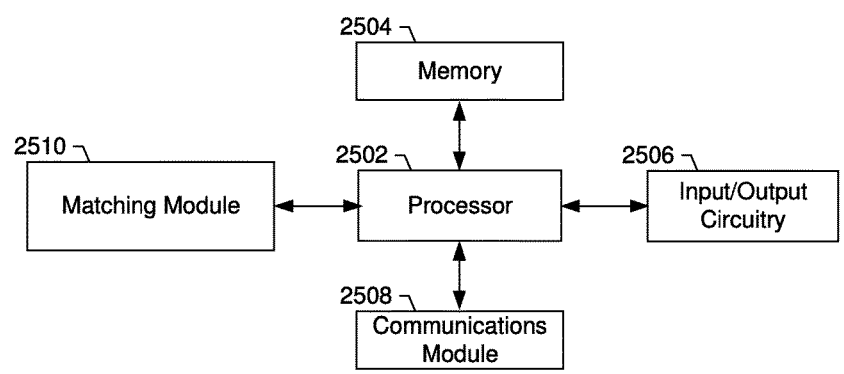

FIG. 25 shows a block diagram showing an example device for programmatically performing group matching and facilitating subsequent interaction, using special-purpose circuitry in accordance with some exemplary embodiments of the present invention.

Figure 26:
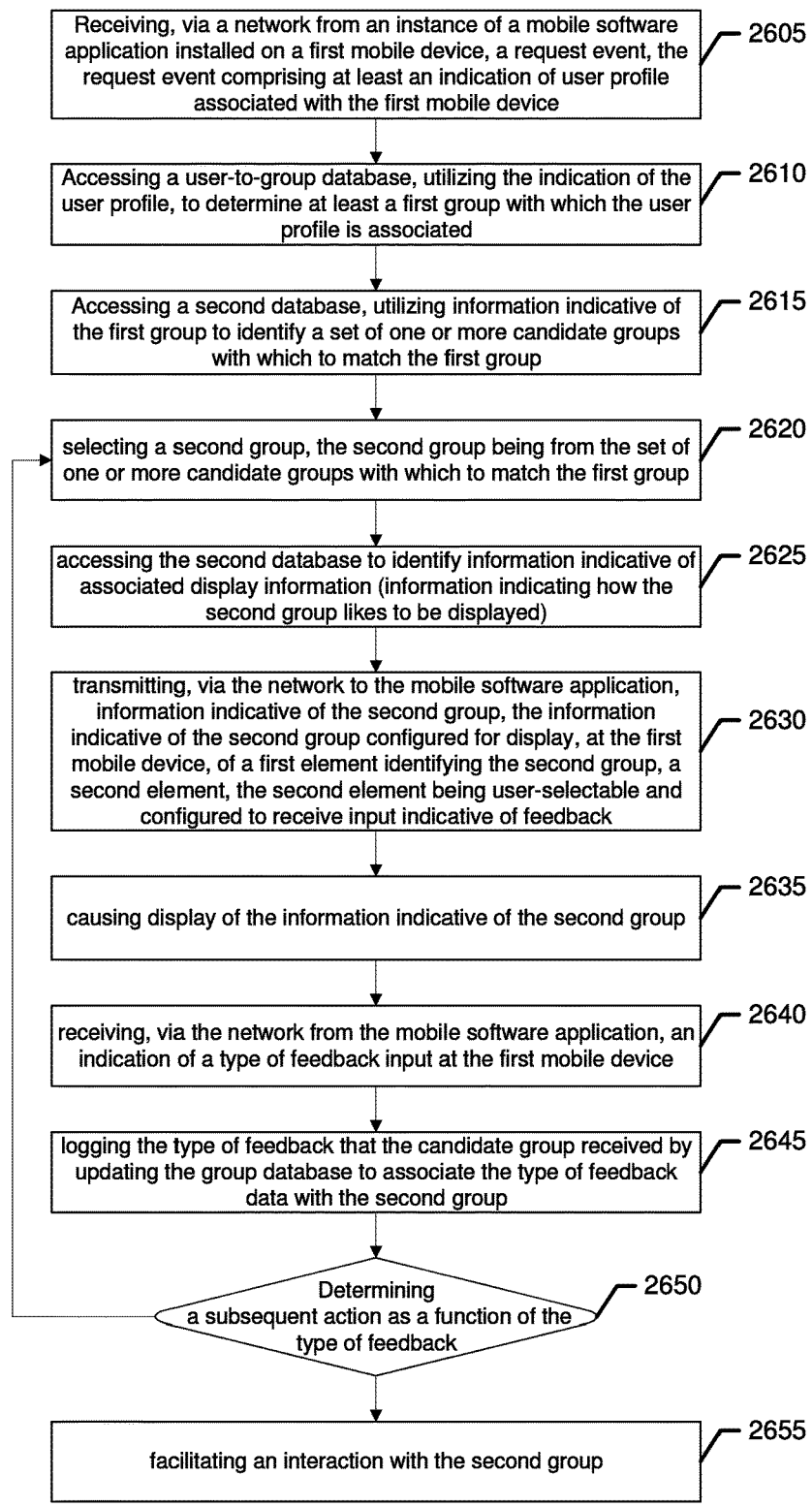

FIG. 26 shows a flowchart depicting example operations for programmatically performing group matching and facilitating subsequent interaction, in accordance with some example embodiments discussed herein.

Figure 27:
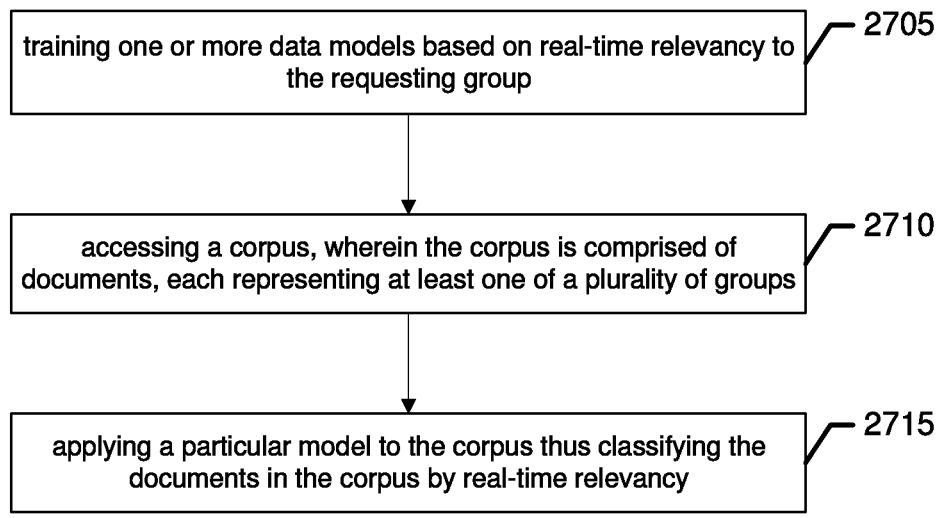

FIG. 27 shows a flowchart depicting example operations for programmatically performing group matching, in accordance with some example embodiments discussed herein.

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Overview

Figure 8:
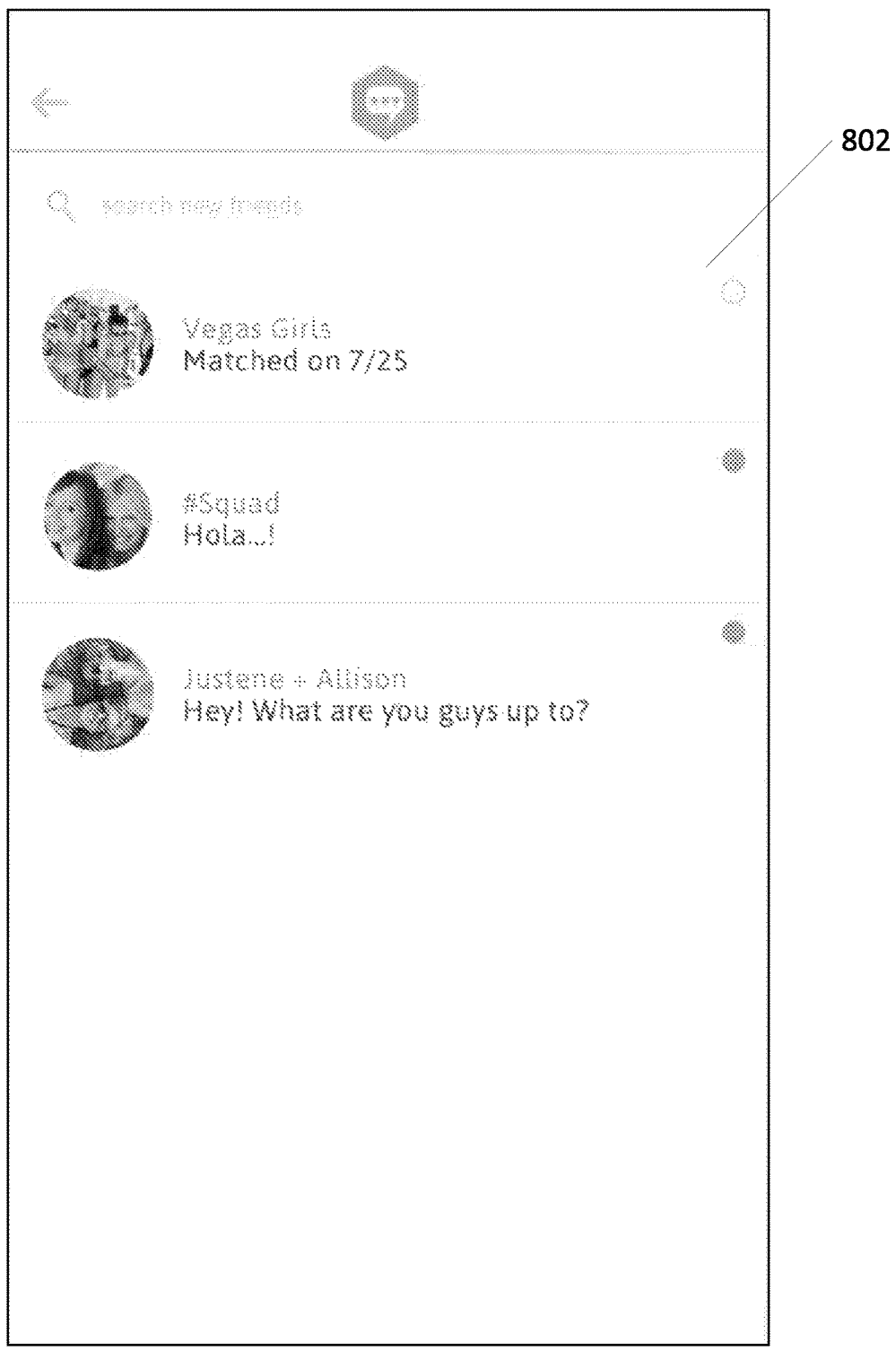
Figure 9:
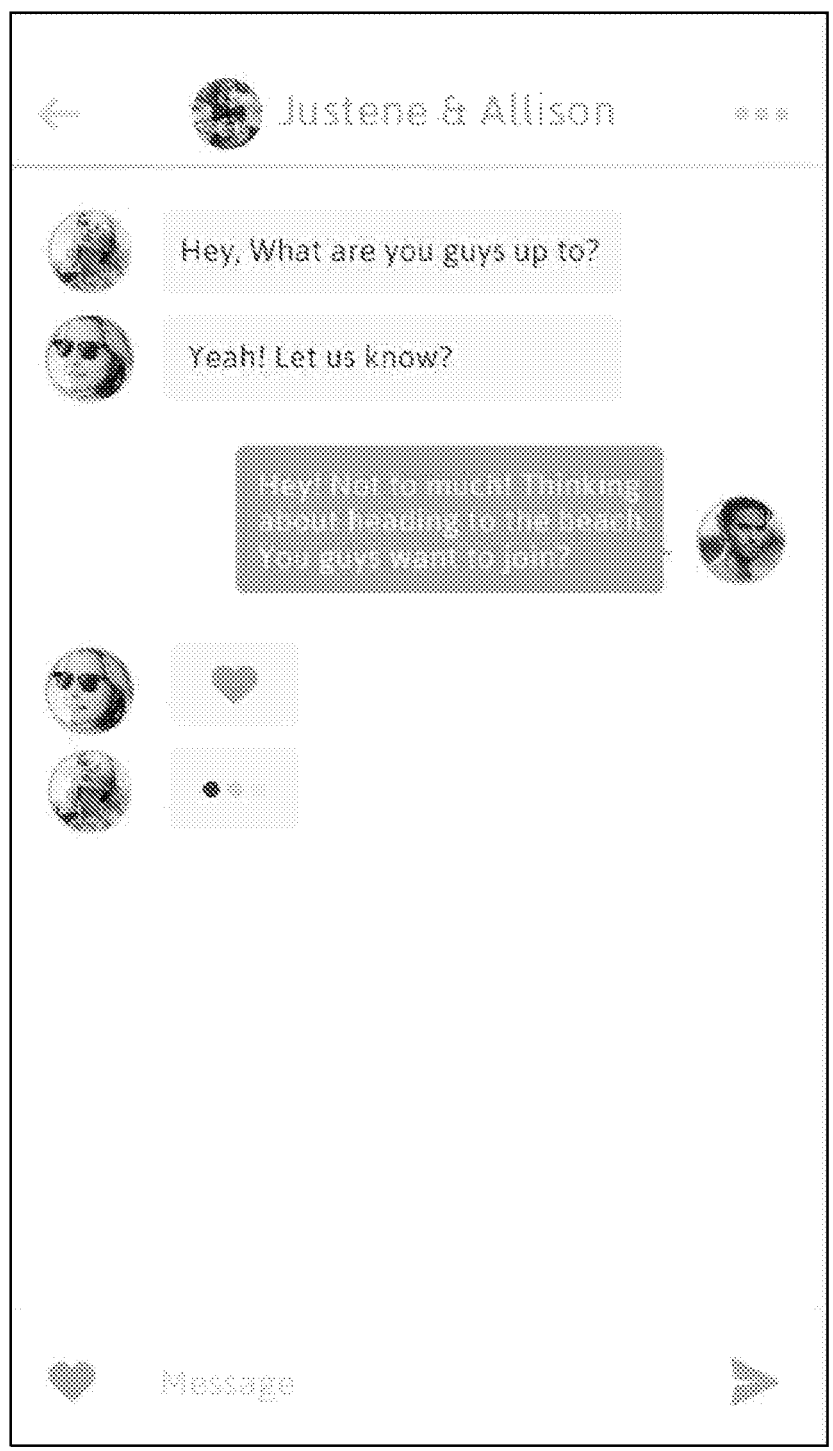

Various embodiments of the present invention are directed to improved systems, apparatuses, methods, and computer readable media for programmatically performing group matching and facilitating subsequent interaction. FIG. 1 shows a high level overview of the certain embodiments of the present invention. As shown, at step 1 the matching service may select a candidate matching group to present on a user's mobile device. Next, as shown at step 2, the candidate group is presented on the user's mobile device. After the candidate group is displayed, as shown at step 3, the user's feedback is received, for example, via a swipe on the touch panel of the user's mobile device. Once feedback is input, the matching service, as shown at step 4, determines if the input represented positive of negative feedback. If the matching service determines that the user provided negative feedback in response to the presentation of the candidate group, the process returns to step 1, where a new candidate group is selected. If, however, the matching service determines that the user provided positive feedback in resposen to the presentation of the candidate group, the process proceeds to step 5. As shown at step 5, the matching service facilitates interaction with the chosen group. In particular, the user may now interact with the chosen group, for example, via messaging, audio, video, virtual reality or the like. Other example interactions may include, additionally or alternatively, group purchasing of goods or services (tickets, travel, etc.). FIGS. 2-23 show various screens that may be presented to the user at their mobile device during the process. FIG. 8 shows a group selection interface 800, in accordance with some embodiments. A user device may be configured to provide the group selection interface 800 to a display of the user device to provide for selective activation of a particular group from a plurality of predefined groups to which the user belongs. The group interface 800 may include selectable groups 802, 804, and 806. Based on user selection of a group, which may be provided to the system, the system may be configured to perform matching and/or other functionality discussed herein using group data associated with the selected group. Advantageously, users are able to form groups around different interests, social circles, etc., and may easily switch between groups.

Figure 10:
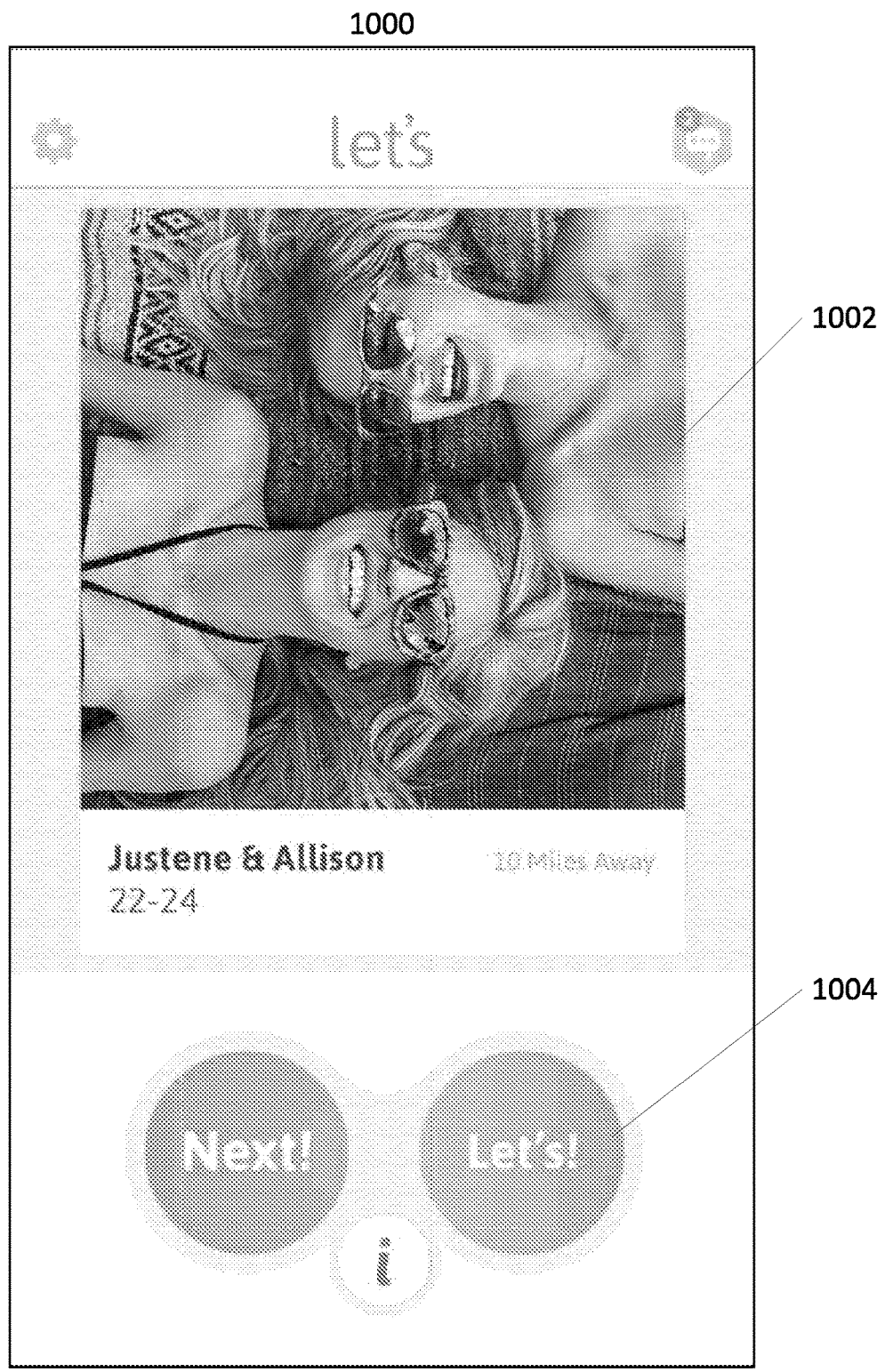
Figure 11:
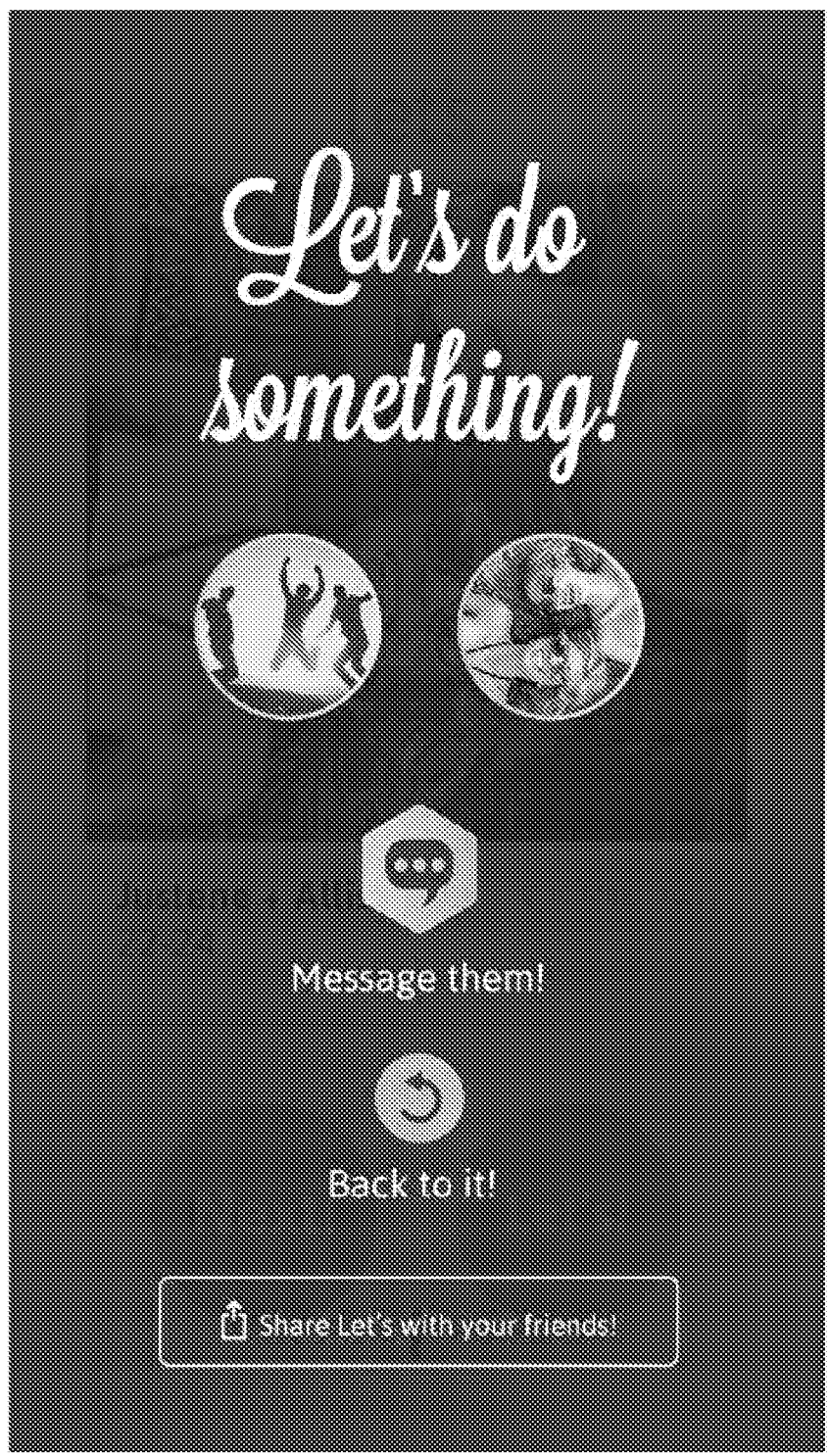
Figure 12:
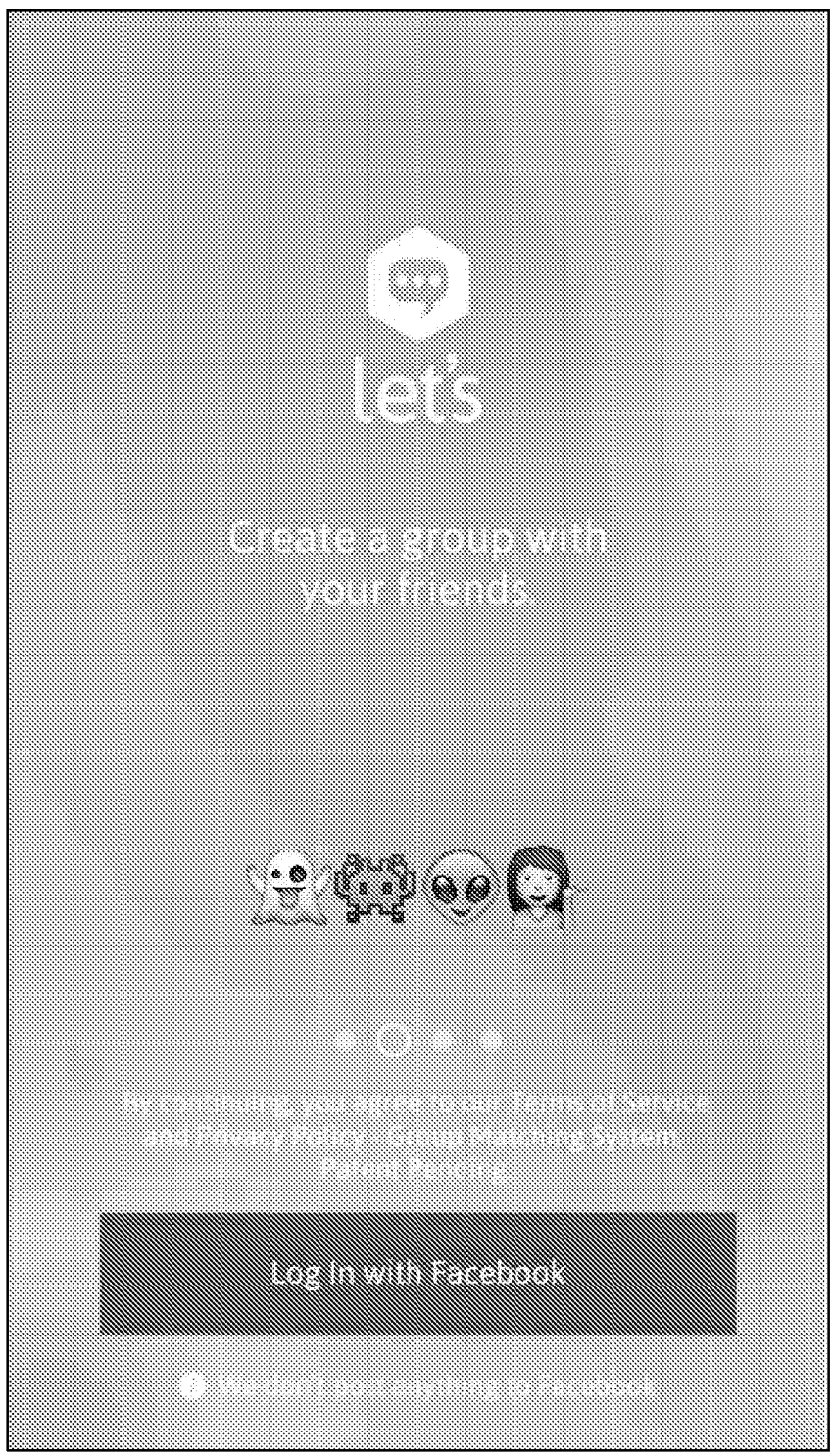
Figure 13:
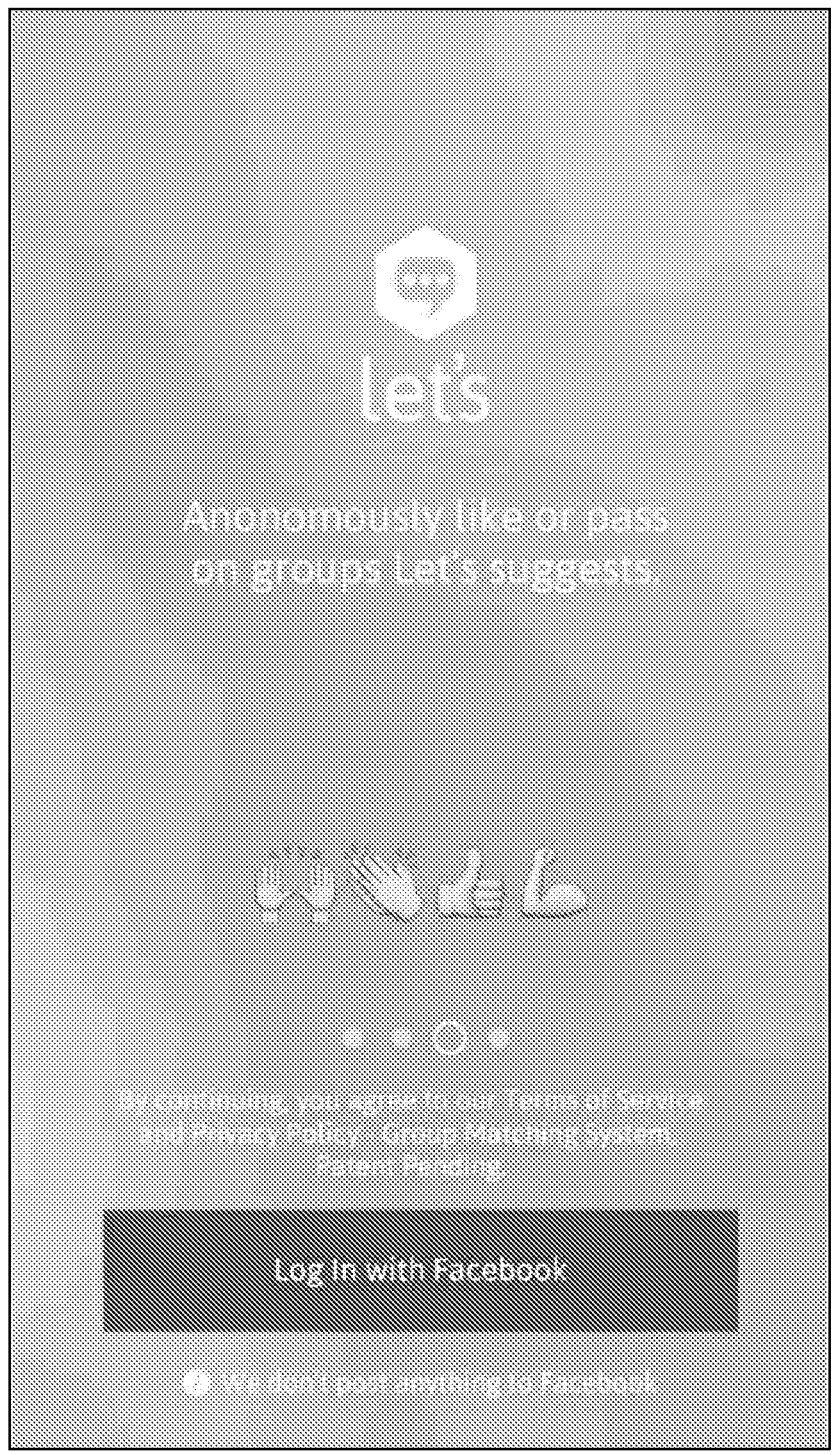
Figure 14:
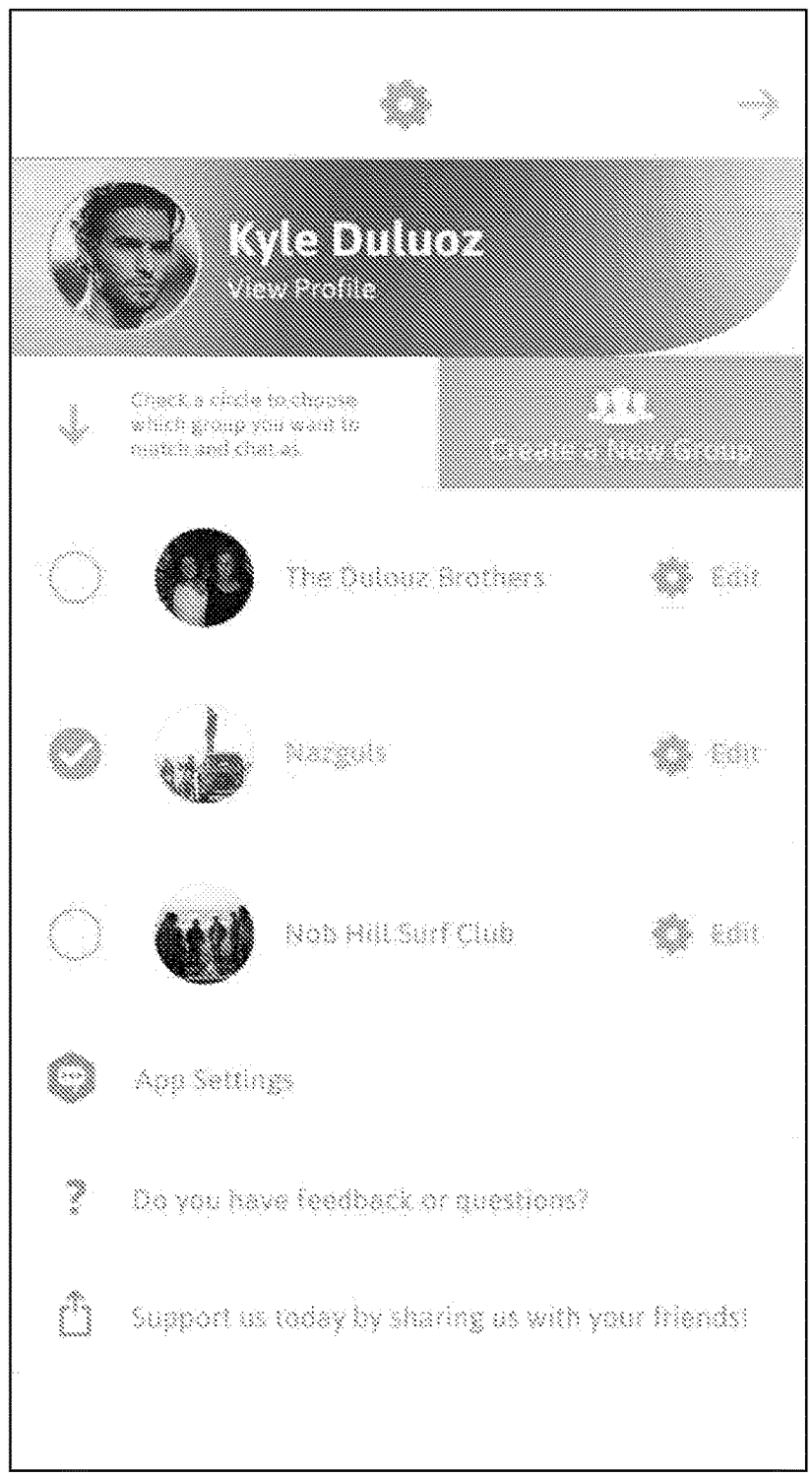
Figure 15:
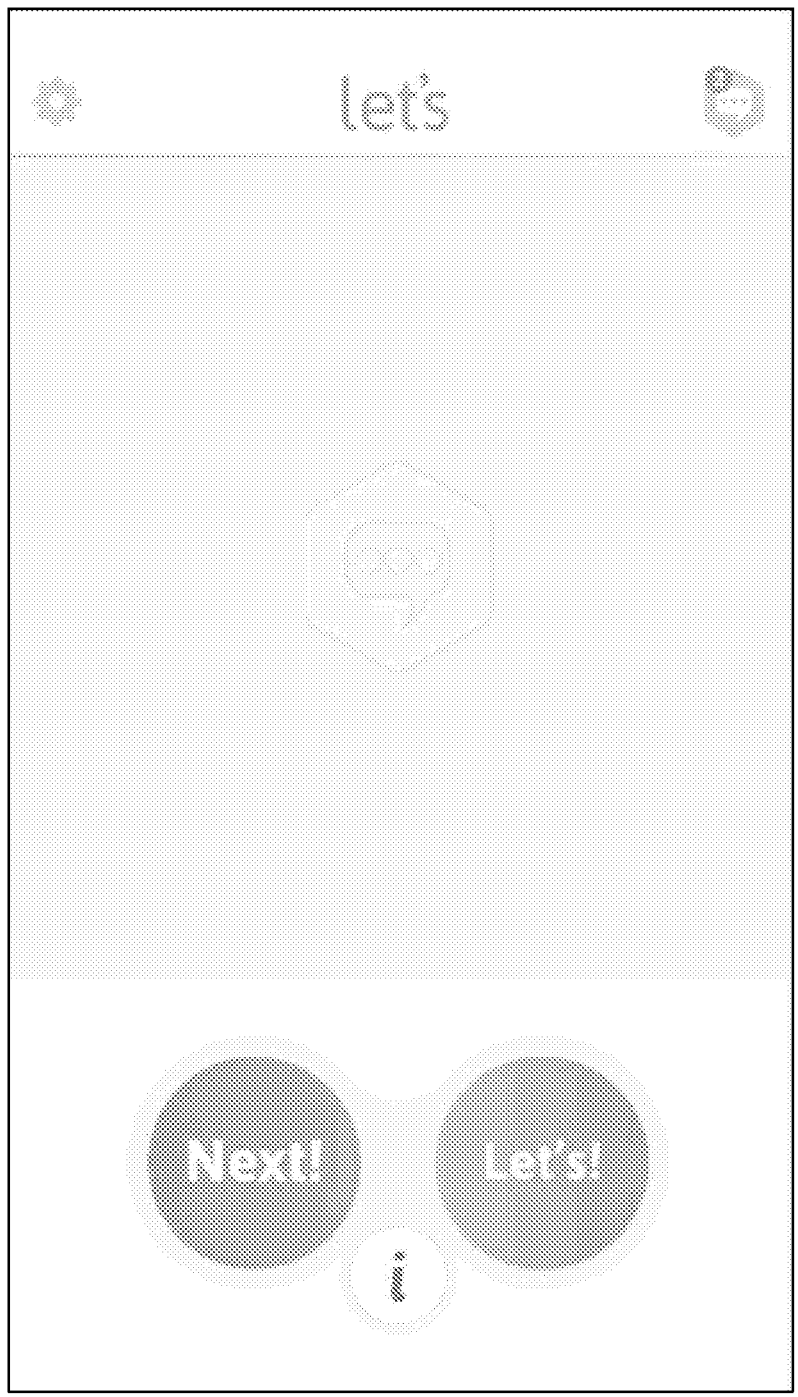
Figure 16:
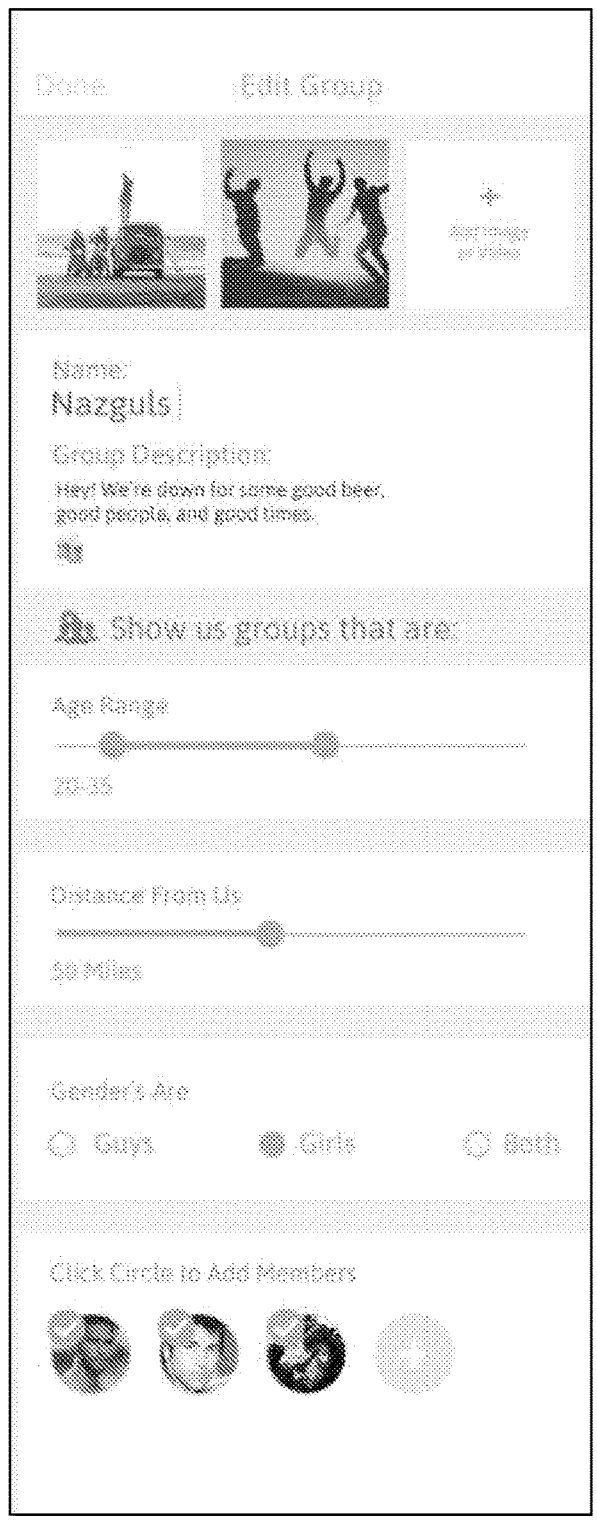
Figure 17:
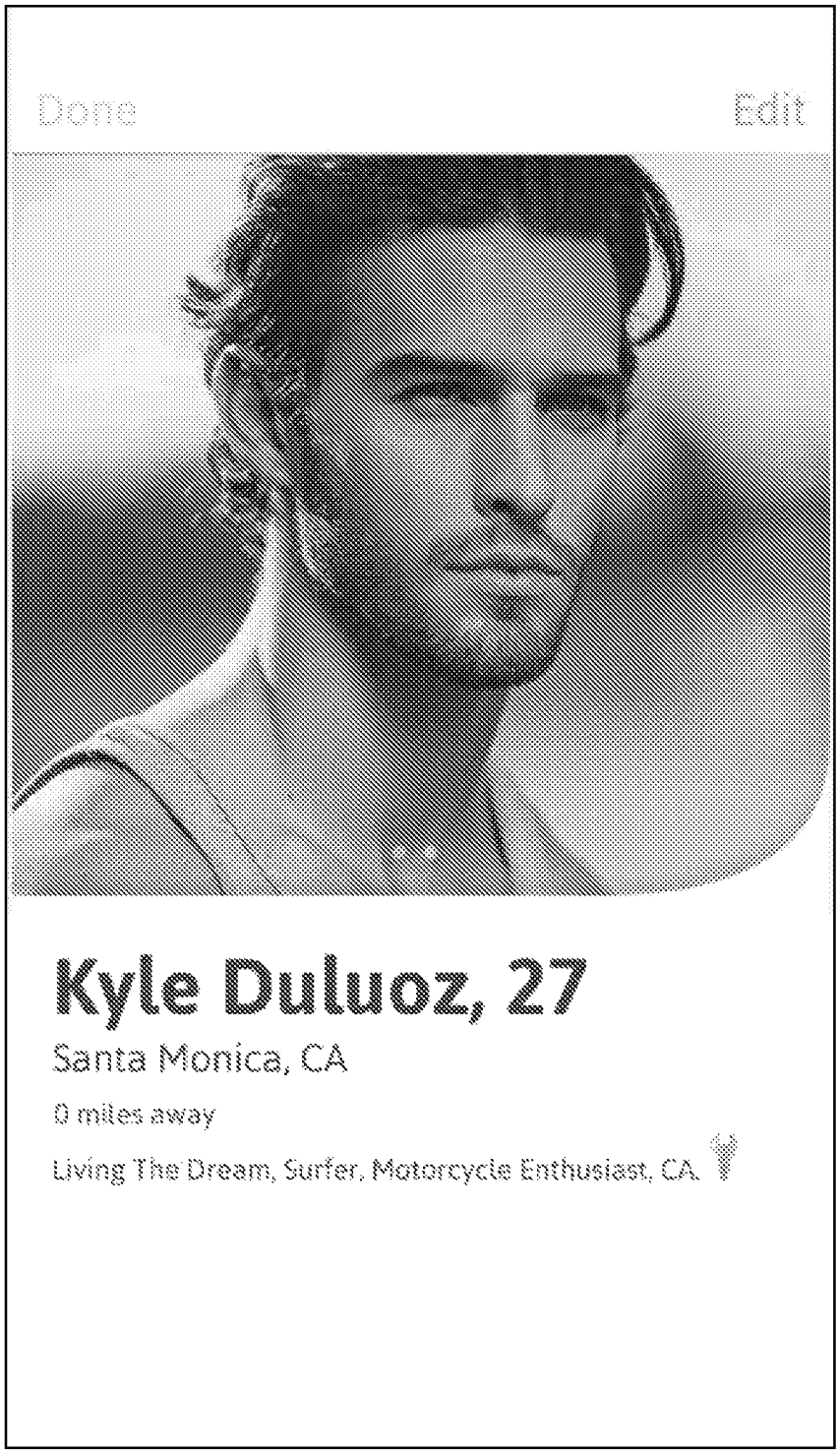
Figure 18:
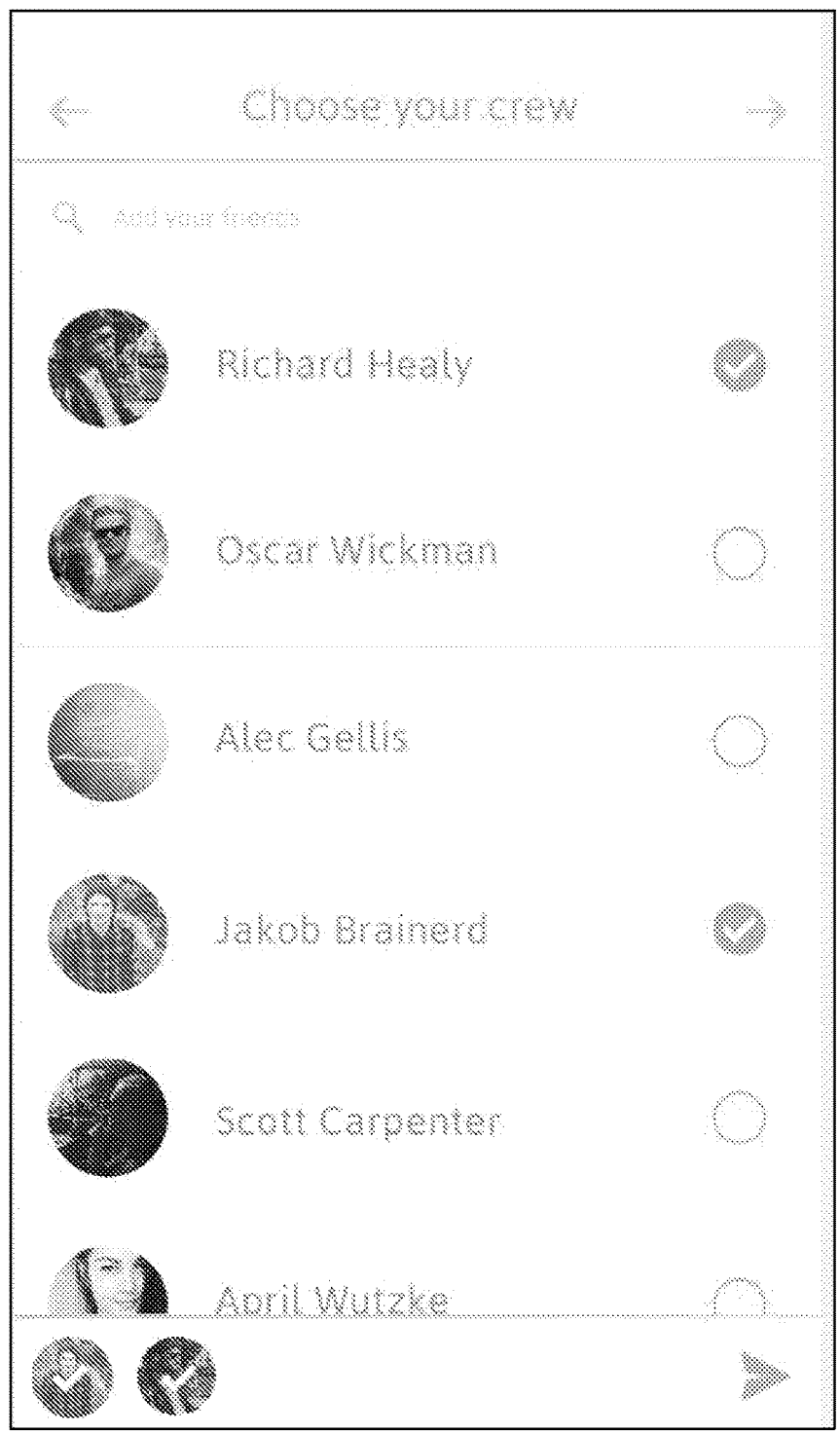
Figure 19:
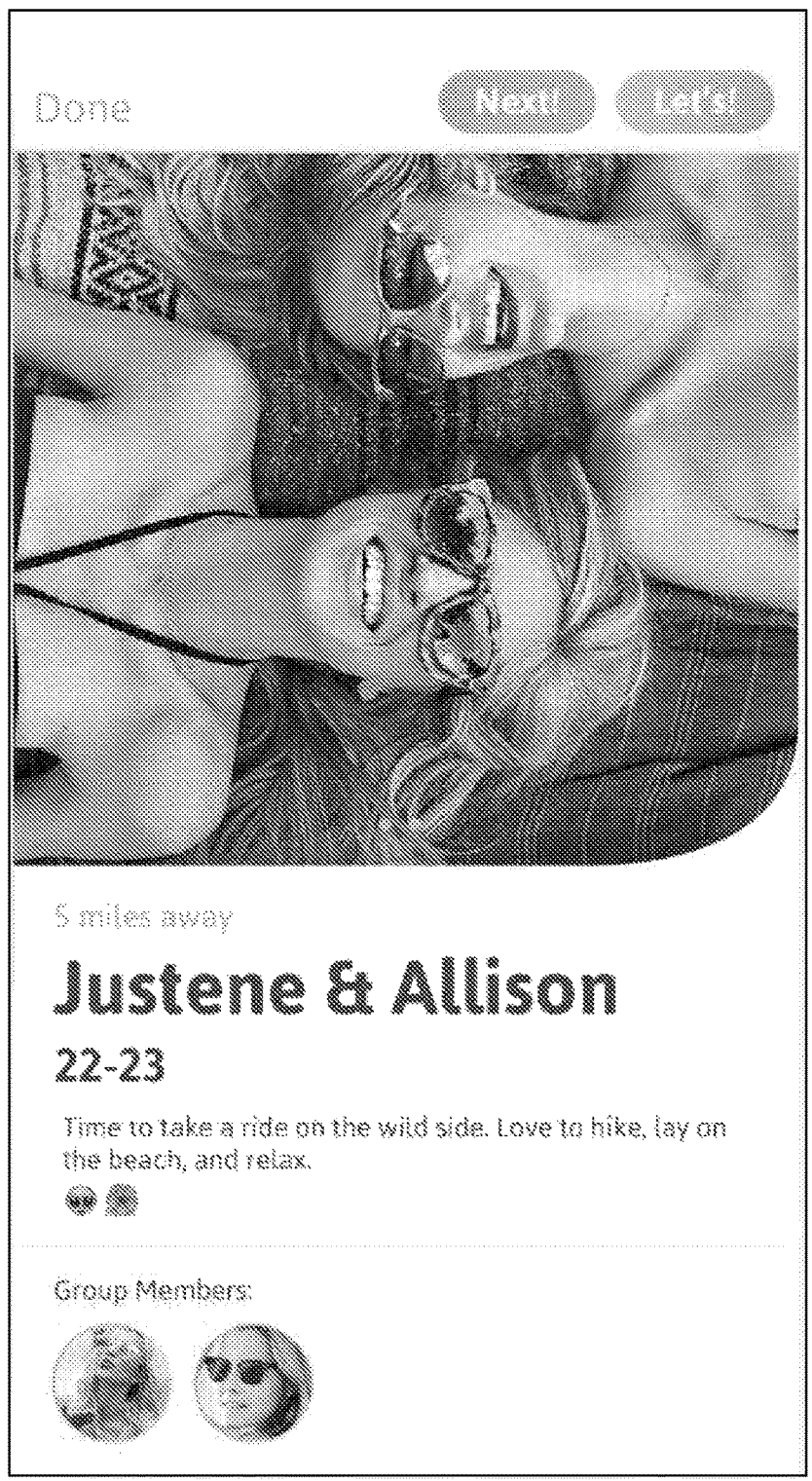
Figure 20:
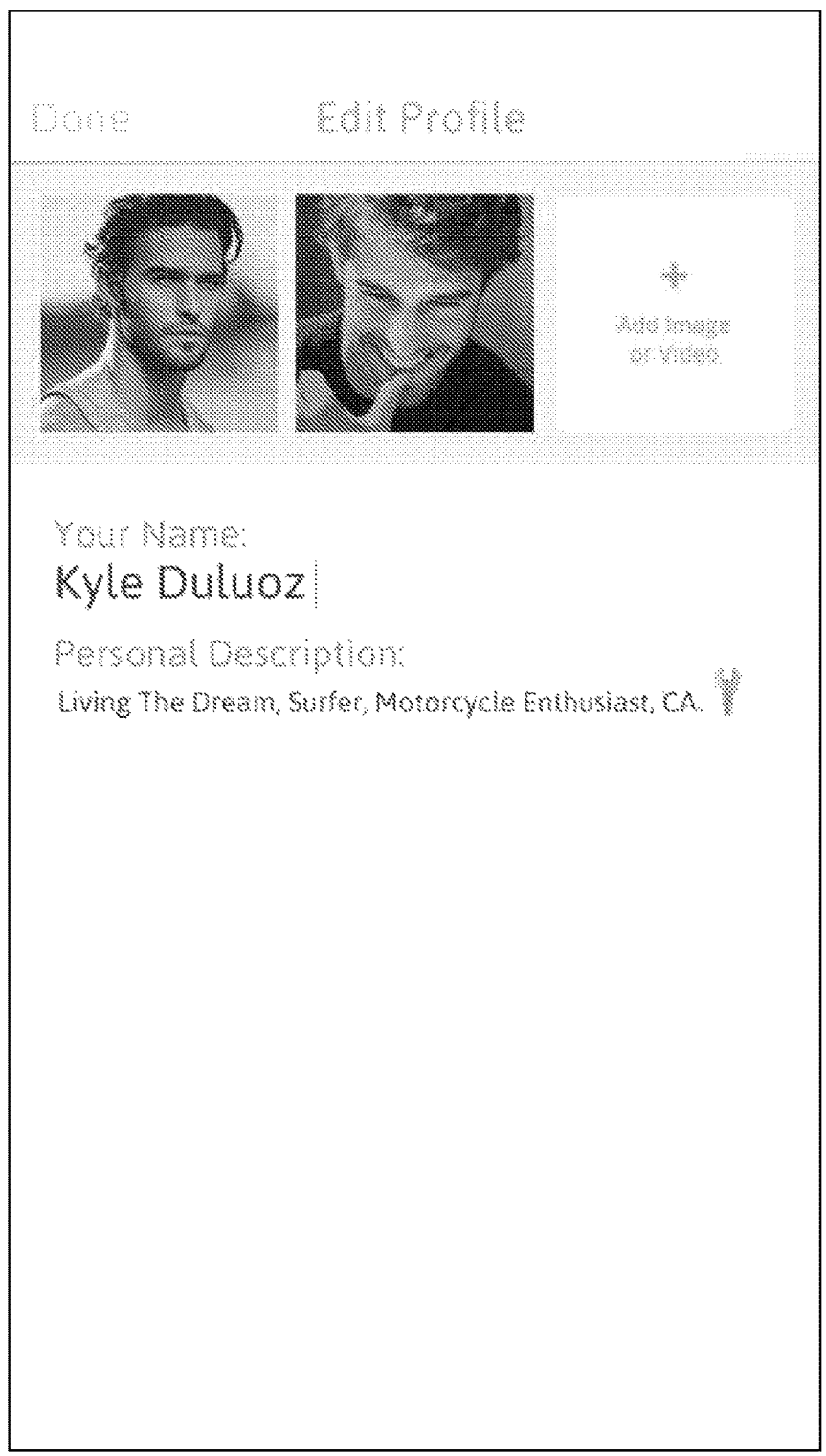
Figure 21:
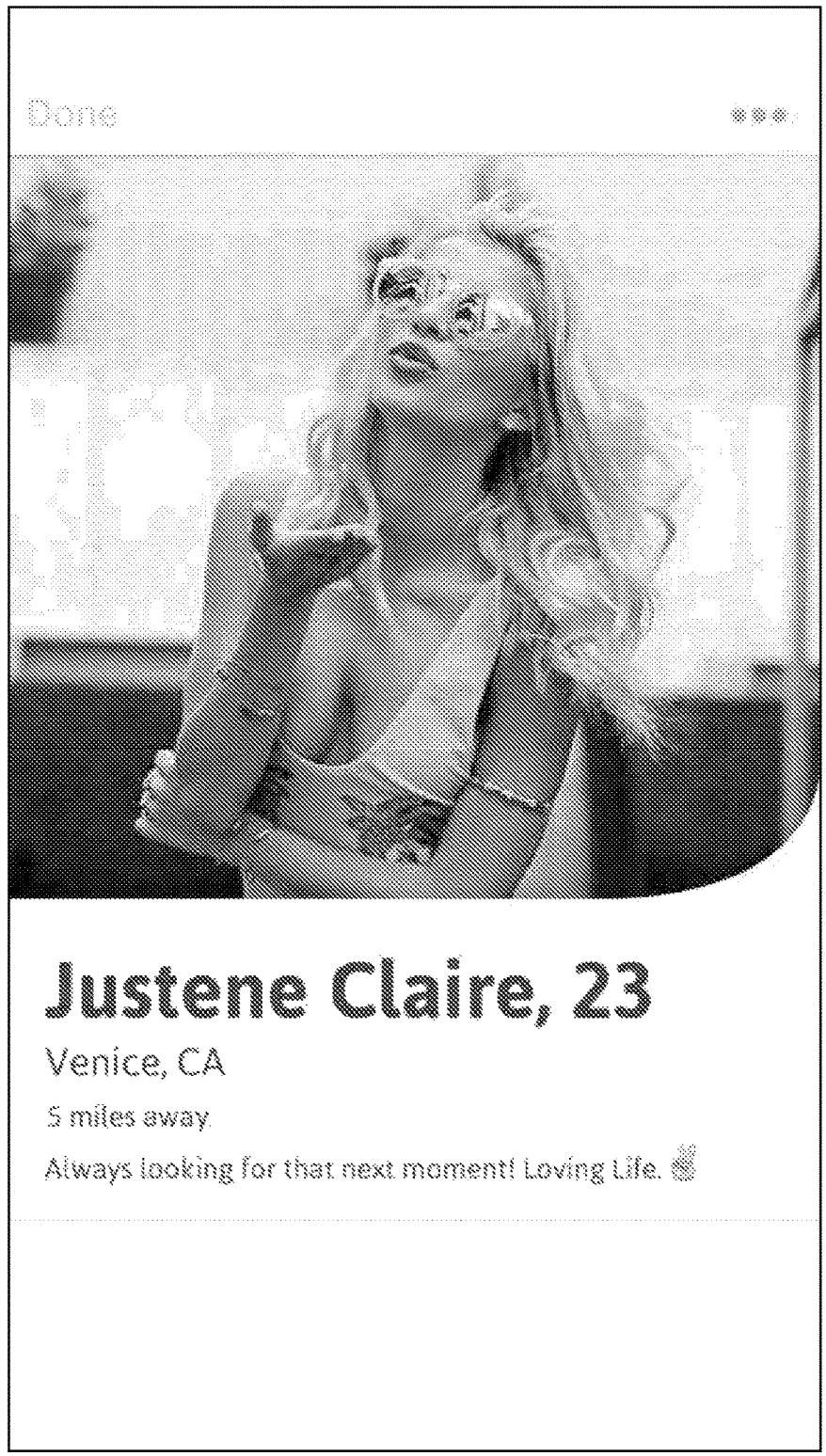
Figure 22:
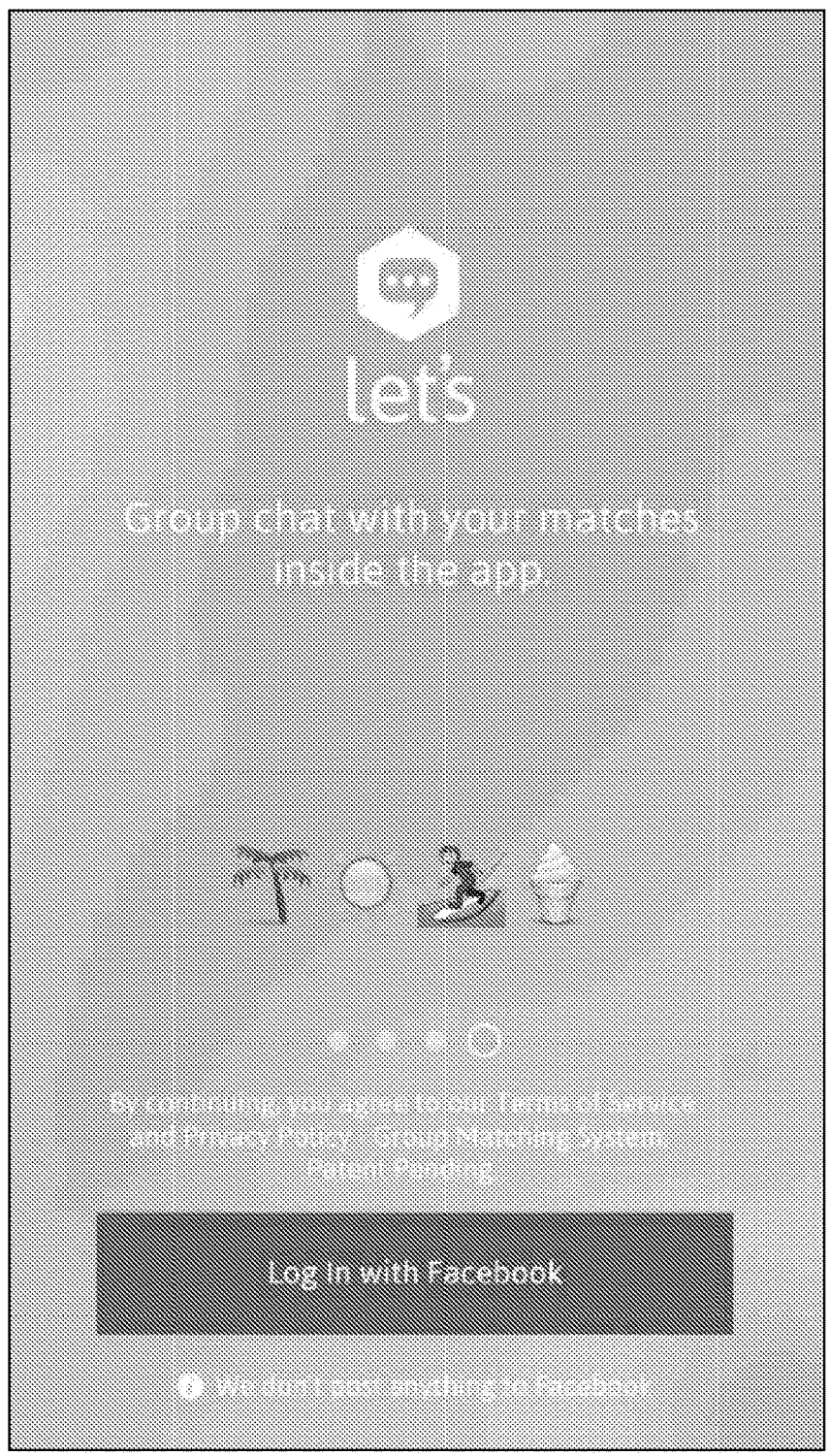
Figure 23:
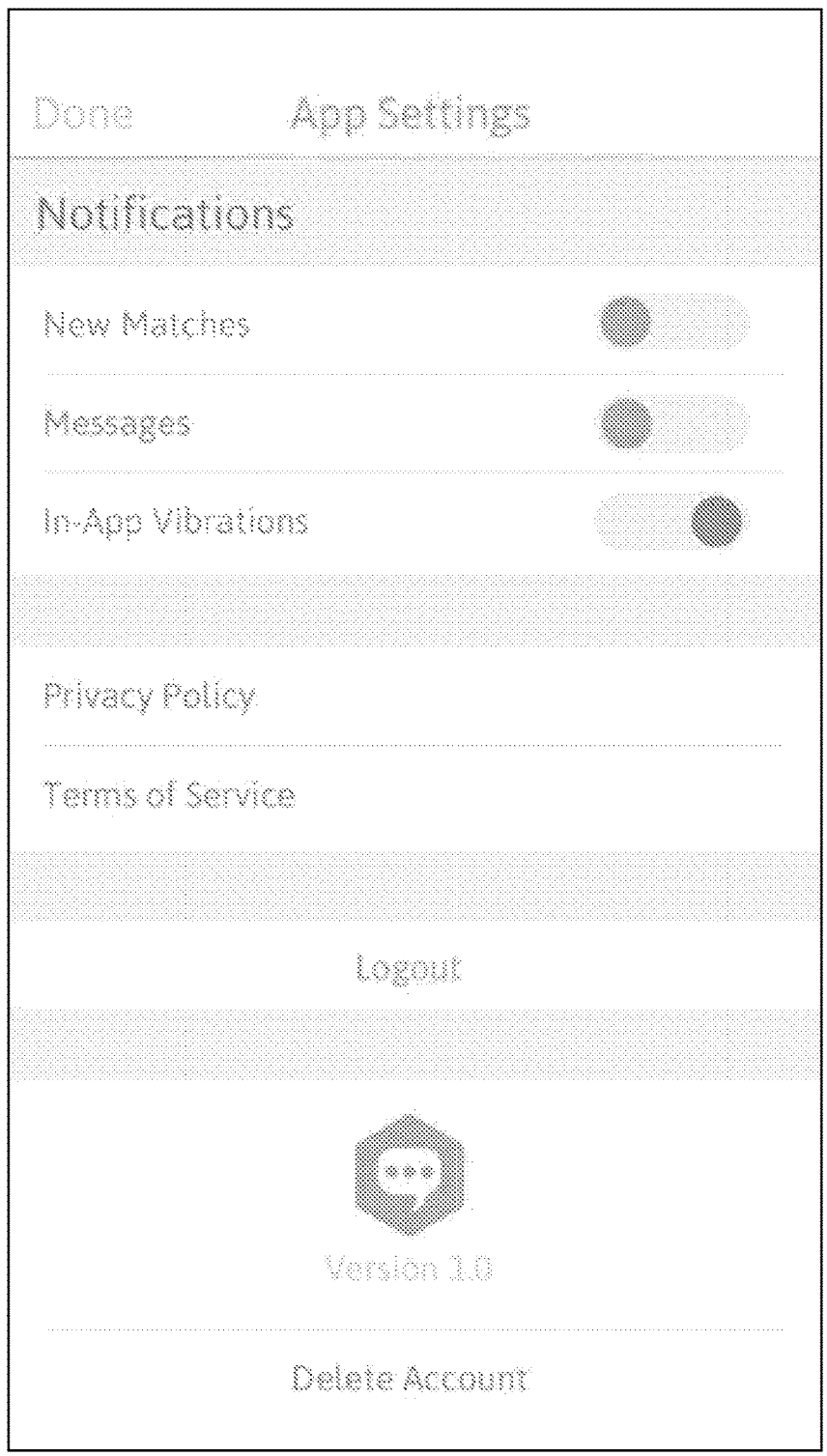

FIG. 10 shows an example of a swipe interface 1000, in accordance with some embodiments. Swipe interface 1000 may include image 1002 representing two or more people (e.g., Justene & Allison). The swipe interface 1000 may be provided to the display of a user device including a touch screen configured to receive consumer device inputs. The user device may be configured to detect touch screen inputs representing a swipe across the image 1002 (and/or other portion of the swipe interface 100), which may trigger an acceptance process (e.g., invitations) for connection. In another example, the swipe may be performed based on some other user device input, such as selection of the invite button 1004 (e.g., via touchscreen tap).

Technical Underpinnings and Implementation of Exemplary Embodiments

Though the use of smart phones has provided ample opportunity for makers of match-making type apps to offer their services on-the-go, none seek to match groups of users based on one or all of group attributes (e.g., running club), aggregation of particular attributes of each individual within a group (e.g., gender 3 males and two females), or the attributes of one or more individuals in the group (e.g., favorite band) based on real time factors for immediate or near-immediate interaction.

That is, while some matching apps do exist (e.g., Tinder®), their focus is matching individuals in the abstract with no thought to real-time factors or immediate or near-immediate subsequent interacation.

System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices. Additionally or alternatively, the method, apparatus, and computer program product of an example embodiment may be embodied by fixed computing devices, such as a personal computer or a computer workstation. Still further, example embodiments may be embodied by any of a variety of mobile terminals, such as a mobile telephone, smartphone, laptop computer, tablet computer, or any combination of the aforementioned devices.

In this regard, FIG. 24 discloses an example computing system within which embodiments of the present invention may operate. In particular, FIG. 24 depicts a block diagram showing an exemplary system 2400, which may include one or more devices and sub-systems that are configured to implement embodiments discussed herein. For example, system 2400 may include matching service 2402, which may include, for example, server 2404 and databases 2406A-N. System 2400 may further comprise a first group 2408 of devices 2410a-2410N and a second group 2412 of devices 2414A-N.

The server 2404 may be embodied as a computer or computers as known in the art. The server 2404 may be configured for receiving of electronic data from various sources, including but not necessarily limited to the mobile devices 2410A-N and 2414N via Network 2416. For example, the server 2404 may be operable to receive a request event, the request event comprising at least an indication of user profile associated with the first mobile device, provided by one or devices 2410A-N or 2414A-N. The server 2404 may also facilitate programmatically performing group matching and facilitating subsequent interaction.

The databases 2406A-N may be embodied as a data storage device such as a Network Attached Storage (NAS) device or devices, or as a separate database server or servers. The databases 2406A-N includes information accessed and stored by the server 2404 to facilitate the operations of the matching service 2402 including the programmatic performance of group matching and facilitatiation of subsequent interaction. For example, the database 2406A may include, without limitation, user profile data, account credentials and/or the like. Database 2406N may include group characteristics or attribute data as well as, in some embodiments, links to or information regarding membership, including for example, groups and their associated members, members and their associated groups, and the like.

The devices 2410A-N or 2414A-N may be any computing device as known in the art and operated by a user. The devices 2410A-N or 2414A-N may be configured to communicate with server 2404 and/or servers 2406A-N. Electronic data received by the server 2404 and server 2406A-N from the devices 2410A-N or 2414A-N may be provided in various forms and via various methods. For example, the devices 2410A-N or 2414A-N may include desktop computers, laptop computers, smartphones, netbooks, tablet computers, wearables, and the like.

In embodiments where one or more of devices 2410A-N or 2414A-N is a mobile device, such as a smart phone or tablet, the device may execute an "app" to interact with the matching service 2402. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

Example Apparatus for Implementing Embodiments of the Present Invention

Server 2404 may be embodied by one or more computing systems, such as apparatus 2500 shown in FIG. 25. As illustrated in FIG. 25, the apparatus 2500 may include a processor 2502, a memory 2504, input/output circuitry 2506, communications circuitry 2508, and matching module 2510.

The apparatus 2500 may be configured to execute the operations described above with respect to FIG. 1 and below with respect to FIGS. 26 and 27. Although these components 2502-2510 are described with respect to functional limitations, it should be understood that the particular implementations necessarily include the use of particular hardware. It should also be understood that certain of these components 2502-2510 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 2500 may provide or supplement the functionality of particular circuitry. For example, the processor 2502 may provide processing functionality, the memory 2504 may provide storage functionality, the communications circuitry 2508 may provide network interface functionality, and the like.

In some embodiments, the processor 2502 (and/or coprocessor or any other processing circuitry assisting or otherwise associated with the processor) may be in communication with the memory 2504 via a bus for passing information among components of the apparatus. The memory 2504 may be non-transitory and may include, for example, one or more volatile and/or non-volatile memories. In other words, for example, the memory may be an electronic storage device (e.g., a computer readable storage medium). The memory 2504 may be configured to store information, data, content, applications, instructions, or the like, for enabling the apparatus to carry out various functions in accordance with example embodiments of the present invention.

The processor 2502 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 2502 may be configured to execute instructions stored in the memory 2504 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 2500 may include input/output circuitry 206 that may, in turn, be in communication with processor 2502 to provide output to the user and, in some embodiments, to receive an indication of a user input. The input/output circuitry 2506 may comprise a user interface and may include a display and may comprise a web user interface, a mobile application, a client device, a kiosk, or the like. In some embodiments, the input/output circuitry 2506 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 2504, and/or the like).

The communications circuitry 2508 may be any means such as a device or circuitry embodied in either hardware or a combination of hardware and software that is configured to receive and/or transmit data from/to a network and/or any other device, circuitry, or module in communication with the apparatus 2500. In this regard, the communications circuitry 2508 may include, for example, a network interface for enabling communications with a wired or wireless communication network. For example, the communications circuitry 2508 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Matching module 2510 includes hardware configured to programmatically perform group matching and facilitate subsequent interaction. Group matching may be based on a individual user or group characteristic data. The matching module 2510 may utilize processing circuitry, such as the processor 2502, to perform these actions. The matching module 2510 may receive the data via a network interface provided by the communications circuitry 2508. However, it should also be appreciated that, in some embodiments, the matching module 2510 may include a separate processor, specially configured field programmable gate array (FPGA), or application specific interface circuit (ASIC) to perform group matching and/or facilitate subsequent interaction. The matching module 2510 is therefore implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 2500. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Exemplary Operations for Implementing Embodiments of the Present Invention

Group Matching

In some embodiments, the system may be configured for programmatically performing group matching and facilitating subsequent interaction. FIG. 26 shows exemplary process for programmatically performing group matching and facilitating subsequent interaction. FIG. 26 shows an example method that may be executed by one or more machines, for example by apparatus 2500, including matching module 2510 of FIG. 25, for programmatically performing group matching and facilitating subsequent interaction, in accordance with some embodiments discussed herein.

In some embodiments, the group matching process may be initiated by a single user, who may or may not be, at the outset, a member of one or more groups. As shown in block 2605 of FIG. 26, an apparatus, such as apparatus 200, may be configured for receiving, via a network from an instance of a mobile software application installed on a first mobile device, a request event, the request event comprising at least an indication of user profile associated with the first mobile device. That is, a mobile device being operated by the user utilizing a group matching application installed on the mobile device, may receive input indicating initialization of the matching process. That indication may then be sent, as a request event, to the matching service described above, with information indicative of the mobile device, the user, or the like. For example, a username, a device ID or the like may be provided in the request event.

Once the request event is received, the matching service may identify which, if any, group or groups the user of the mobile device is associated with. As shown in block 2610 of FIG. 26, an apparatus, such as apparatus 200, may be configured for accessing a user-to-group database, utilizing the indication of the user profile, to determine at least a first group with which the user profile is associated.

Group Formation/Characteristics of a Group

Groups (e.g., a surf club) may be formed, joined, or associated with in advance (e.g., at registration, enrollment, or installation of the app), or in some embodiments ad-hoc (e.g., two friends meeting up at the park). In some embodiments, the request event may allow for ad-hoc group formation at that time and, additionally, in some embodiments, enable a purpose, destination, or interest to be specified at the time of the request (e.g., hailing a cab outside of a restaurant), which may serve to, at the indication of the user, override particular group or individual characteristics or alternatively, be used in conjunction with particular group or individual characteristics.

Each group may comprise or otherwise be associated with its own group profile. Additionally or alternatively, a group may comprise or otherwise be associated with one or more members' individual profiles. In some embodiments, additionally or alternatively, a group may be associated with a particular interest, event, and/or location. (e.g., away team fans at a sporting event, a running group, a couple friends heading to the beach, etc.)

In the profiles (i.e., the individual profiles or the group profiles) each member or one or more authorized members may add videos, pictures, current activities/plans, favorite music, a destination, etc. In some embodiments, some of which can be automatically or randomly generated. For example, a song about summer may be added where a user has an interest in music and a destination of the beach.

The matching, which is described later, may consider seek to match groups of users based on one or all of the group attributes (e.g., running club), aggregation of particular attributes of each individual within a group (e.g., gender—3 males and two females), or the attributes of one or more individuals in the group (e.g., favorite band) based on real time factors (e.g., location, size of group present, etc.) for immediate or near-immediate interaction.

In some embodiments, a phone's accelerometer and/or microphone may be utilized to detect relevant patterns (e.g., heartbeats) to define attributes/patterns/personality traits about a user, and as such, used by the matching service to determine compatibility with other users to recommend matches.

In some embodiments, the matching service may be configured for receiving, in conjunction with the indication of the user profile, an indication of a current personality profile. For example, a user may be part of a surfing club and running club. The matching service may also be configured for determining, as function of both the indication of the user profile and the indication of the current personality profile, the at least first group with which the user profile is associated. That is, users may be associated with more than one group, and which one they are using may be indicated by the current personality profile.

Determination and Selection of a Candidate Group from One or More Candidate Groups Once the request event is received and the mobile device from which the user sent the request event is associated with one or more of a first group, interest, destination, or the like, the matching service identifies one or more groups with which to match the first group based on any number of factors. Accordingly, as shown in block 2615 of FIG. 26, an apparatus, such as apparatus 200, may be configured for accessing a second database, utilizing information indicative of the first group to identify a set of one or more candidate groups with which to match the first group.

In some embodiments, a set of candidate groups is identified, and the matching service selects one, for example, by taking the top-ranked group by real-time relevancy or the like. As shown in block 2620 of FIG. 26, an apparatus, such as apparatus 200, may be configured for selecting a second group, the second group being from the set of one or more candidate groups with which to match the first group.

Once a second group is selected, in some embodiments, the matching service may access a database to identify information indicating how the second group likes to be displayed. For example, a group may have chosen a particular picture, skin, or the like to be displayed, representative of the group, a particular song to be played, a particular to be shown, etc. As shown in block 2625 of FIG. 26, an apparatus, such as apparatus 200, may be configured for accessing the second database to identify information indicative of associated display information.

This information is then transmitted, in a format configured for display at the mobile device, to the mobile device, thereby presenting the second group as a candidate for matching. As shown in block 2630 of FIG. 26, an apparatus, such as apparatus 200, may be configured for transmitting, via the network to the mobile software application, information indicative of the second group, the information indicative of the second group configured for display, at the first mobile device, of a first element identifying the second group, a second element, the second element being user-selectable and configured to receive input indicative of feedback. And as shown in block 2635 of FIG. 26, an apparatus, such as apparatus 200, may be configured for causing display of the information indicative of the second group.

Reception and Use of Feedback

Once the information representative of the second group is received and caused to be displayed on the interface of the mobile device, the mobile device may be configured to receive feedback from the user, for example, via a swipe on the hardware device's touch panel.

As shown in block 2640 of FIG. 26, an apparatus, such as apparatus 200, may be configured for receiving, via the network from the mobile software application, an indication of a type of feedback input at the first mobile device.

In some embodiments, the system may be configured to enable multi finger and/or directional swiping. Users, for example, may swipe with one finger to "like", two fingers to invite to an event, or three fingers to video chat, or other combinations of swipe directions and finger numbers/touches.

In some embodiments, the process may then proceed in one or two directions. That is, in an instance of a first type of feedback (e.g., negative feedback), the matching service may then be configured for selecting a third group from the set of one or more candidate groups to present to the user via the mobile device. Whereas, in an instance of a second type of feedback (e.g., positive), the matching service may be configured for facilitating an interaction with the second group.

Logging of Feedback

In some embodiments, the matching service may log the feedback received from the mobile device and optionally, associate the feedback with any of the user, the first group, and the second group, which may aid in subsequent matching and/or training of matching models. As shown in block 2645 of FIG. 26, an apparatus, such as apparatus 200, may be configured for logging the type of feedback that the candidate group received by updating the group database to associate the type of feedback data with the second group.

Two-way Authorization

In some embodiments, before enabling interaction with a matched group, the system may be configured to provide, present or otherwise solicit authorization from the matched group before providing access via interaction (e.g., enabling the first group to communicate with second group). In some embodiments, any user of the second group may provide authorization, whereas in other embodiments, a particular person may be designated or approved to authorize interactions.

Interaction with the Matched Group

In some embodiments, the subsequent action or the type of interaction may be a function of the feedback. As described above, a single finger swipe may indicate one type of desired interaction, whereas a two finger swipe may indicate another. As shown in block 2650 of FIG. 26, an apparatus, such as apparatus 200, may be configured for determining a subsequent action as a function of the type of feedback.

Again, similar to above, some types of interaction may require authorization from the second group, whereas other may not. In those instances in which the indicated interaction type is authorized or otherwise ok, the matching service may be configured for facilitating the interaction. In some embodiments, each individual user or group may opt in to specified types of interaction. As shown in block 2655 of FIG. 26, an apparatus, such as apparatus 200, may be configured for facilitating an interaction with the second group.

Exemplary embodiments describing the interactions are described below.

Determination Processes

FIG. 27 shows a flowchart describing an exemplary process for selecting a candidate group with which to match the requesting group. For example, the system may be configured to classify each group into a set of candidate groups and a set of non-candidate groups. As shown in block 2705 of FIG. 27, an apparatus, such as apparatus 200, may be configured for training one or more data models based on real-time relevancy to the requesting group. For example, certain interests, group demographics, etc. may each have different relevant characteristics of matching groups. For example, matching a user or group to others in taking a cab to a live music venue may value a model that considers real-time proximity whereas a group looking for competition in an on-line game may not value a model that considers proximity.

Subsequently, as shown in block 2710 of FIG. 27, an apparatus, such as apparatus 200, may be configured for accessing a corpus, wherein the corpus is comprised of documents, each representing at least one of a plurality of groups. The system may then apply a particular model to the corpus, for example, depending on the attributes of the user and/or group, classifying the documents in the corpus by real-time relevancy. As such, as shown in block 2715 of FIG. 27, an apparatus, such as apparatus 200, may be configured for applying a particular model to the corpus. That is, the documents in the corpus may be classified by their immediate, near immediate, or real-time relevancy (i.e. determining whether each group is a relevant match right now based on the characteristics and/or attributes (e.g., current location, interests, whether the group is active, spending behavior, destination, or the like). Training data for each of the plurality of classifiers may comprise historical feedback data of the group or, in some embodiments, similar group (e.g., those sharing particular attributes such as size, ages, genders, location, interests, level of activity, etc.)

Once a model has been derived from an initial training data set, the system may be configured to monitor performance of the model and update the training data set so that the model may be adapted incrementally to changes in the behavior of the user. Incremental adaptation of a model reduces the costs involved in repeatedly replacing the model.

Exemplary Embodiments

In an exemplary embodiment, a group/individual seeking a group/individual match to use Uber dispatch/hail and transaction system, the matching service may match users with each other and then enable hail/dispatch Ubers, Lyfts, etc. to meet at a location, or pick up all members of all groups on the way to a location.

In another exemplary embodiment, a group/individual seeking a group/individual match in a Venmo/PayPal style money transfer, the matching service may couple to a peer-to-peer payment transaction. Users may match and then send money back and forth to each other.

In another exemplary embodiment, a group/individual seeking a group/individual match in a restaurant reservation and payment transaction . . . . Users can match and then be enabled to reserve tables at restaurants at a date and time and then make a pre-payment.

In another exemplary embodiment, a group/individual seeking a group/individual match in a VR event recommendation and activation, the matching service may be configured to match and then enable to meet in a (e.g., paid or free) virtual reality environment.

In another exemplary embodiment, a group/individual seeking a group/individual match may be enabled to "add/follow" one or more members on Snapchat/Facebook/Instagram, etc. In some embodiments, the matching service may make the match and automatically adds all members to each other's friends/follows lists on social media accounts.

In another exemplary embodiment, a group/individual seeking a group/individual match may then receive a recommendation of an equidistant (or near equidistant) location/venue to meet at, for example, a Pokemon Go poke stop, or location to do a Pokemon battle.

In another exemplary embodiment, a group/individual seeking a group/individual match may be coupled to Augmented Reality event trigger, for example, a Pokemon Go game action, an augmented reality event/game/app trigger location to meet at, or the like.

FIGS. 26 and 27 illustrate example flowcharts of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other devices associated with execution of software including one or more computer program instructions.

For example, in reference to FIG. 26, one or more of the procedures described herein may be embodied by computer program instructions. In this regard, the computer program instructions which embody the procedures described above may be stored by a memory 2504 of an apparatus employing an embodiment of the present invention and executed by a processor 2502 in the apparatus.

As will be appreciated by one of ordinary skill in the art, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 26 and 27 when executed, convert a computer or processing circuitry into a particular machine configured to perform an example embodiment of the present invention. Accordingly, the operations of FIGS. 26 and 27 define an algorithm for configuring a computer or processing to perform an example embodiment. In some cases, a general purpose computer may be provided with an instance of the processor which performs the algorithms of FIGS. 26 and 27 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified. Moreover, in some embodiments, additional optional operations may also be included. It should be appreciated that each of the modifications, optional additions or amplifications below may be included with the operations above either alone or in combination with any others among the features described herein.

Additional Embodiments

In some embodiments, a method of a single swipe action on a touch or position-sensing interface that when an image is swiped representing two or more anonymous people which is coupled to a mechanism which in-turn triggers a group acceptance process, involving 2 or more people, which in turn triggers a messaging process (email, chat, chatbox, in-app-chat-box, social messaging, texting, video chat, real-time, non-real-time, etc) that connects two or more people.

In some embodiments, a method of a single swipe action on a touch or position-sensing interface that when an image is swiped representing two or more anonymous people which is coupled to a mechanism which in-turn triggers a mechanism of matching multiple people to multiple people; whereby one or more people from each group approve of the match; which in turn notifies all members of both (or all) groups of the match.

In some embodiments, a method of a single swipe action on a touch or position-sensing interface that when an image is swiped representing two or more anonymous people which is coupled to a mechanism which in-turn triggers a mechanism for aggregating multi person attraction likes/interests/affinities matching algorithms.

In some embodiments, a method of a single swipe action on a touch or position-sensing interface that when an image is swiped representing two or more people which is coupled to a mechanism which in-turn triggers a group acceptance process, involving 2 or more people, which in turn triggers a messaging process (email, chat, chatbox, in-app-chat-box, social messaging, texting, video chat, real-time, non-real-time, or similar or combinations thereof, etc) that connects two or more people. For example, a central system may be configured to connect and/or route grouped user devices to connect users within a video chat session, which may be hosted by the central system, a selected user device, or a third party system.

For example, the system may be configured to programmatically aggregate user data of grouped users to generate group data. The group data, for example, may include a merging of user profile data. The system may be further configured to compare group data associated with different groups to perform the group matching.

In some embodiments, a method of a single swipe action on a touch or position-sensing interface that when an image is swiped representing two or more anonymous people which is coupled to a mechanism whereby each individual user can create and/or join and become a member of one or more groups.

In some embodiments, a method of a single swipe action on a touch or position-sensing interface that when an image is swiped representing two or more anonymous people which is coupled to a mechanism whereby an individual user can create and/or join and become a member of one or more groups, of which process of joining or forming the group requires the approval, invitation, or acceptance by one or more members in that group. In some embodiments, various other user device inputs (e.g., non-single swipe actions) may be used to trigger functionality discussed herein.

Some embodiments may provide for improved user devices interfaces for group matching related functionality. In some embodiments, a method of a single swipe action on a touch or position-sensing interface that when an image is swiped representing two or more people which is coupled to a mechanism which in-turn transmits messages to two or more people.

In some embodiments, an online community which is organized as groups of individuals, which is coupled to a mechanism whereby each individual user can create and/or join and become a member of one or more groups.

In some embodiments, an online community which is organized as groups of individuals, which is coupled to a mechanism whereby an individual user can create and/or join and become a member of one or more groups, of which process of joining or forming the group requires the approval, invitation, or acceptance by one or more members in that group.

In some embodiments, an online community which is organized as groups of individuals, which is coupled to a mechanism whereby each individual user can create and/or join and become a member of one or more groups, of which the online community couples two or more groups to cross-message among two or more groups; of which that messaging process could be any of: email, chat, chatbox, in-app-chat-box, social messaging, texting, video chat, real-time, non-real-time, or similar or combinations thereof, etc.

In some embodiments, an online community which is organized as groups of individuals, which is coupled to a mechanism whereby each individual user can create and/or join and become a member of one or more groups, of which the online community couples two or more groups that vote/accept/match/approve of messaging between the two or more groups; of which that messaging process could be any of: email, chat, chatbox, in-app-chat-box, social messaging, texting, video chat, real-time, non-real-time, or similar or combinations thereof, etc.

In some embodiments, an online community which is organized as groups of individuals, which is coupled to a mechanism whereby each individual user can create and/or join and become a member of one or more groups, of which the online community couples, displays, matches and filters based on the group's personality profile.

In some embodiments, an online community which is organized as groups of individuals, which is coupled to a mechanism whereby each individual user can create and/or join and become a member of one or more groups, of which the online community couples, displays, matches and/or filters based on the group's personality profile.

In some embodiments, an online community which is organized as groups of individuals, which is coupled to a mechanism whereby each individual user can create and/or join and become a member of one or more groups, of which the online community matches, ranks the display of, and filters based the group's personality profile; ranking of which such that a multiple-choice display (or display in sequence) of the groups is presented in a rank/sequence based on factors including but not limited to: group's overall geographical distance, group's overall age; group's likes/preferences, etc. Such "group overall" or aggregated calculation to be by means of average, median, group-epicenter, weighted average, group's weighted interest profiles, etc.

In some embodiments, an online community which is organized as groups of individuals, which is coupled to a mechanism whereby each individual user can create and/or join and become a member of one or more groups, of which a particular online group profile is automatically generated as an aggregation or sequence of the individuals comprising the group; including but not limited to: creating a photo or video collage (representing the combined individuals of the group), lists of data that are aggregated then de-duplicated (for example by combining the favorite musical groups of each of the group's individual members), mathematical-derived summary information (for example the average age of the group is calculated by calculating the average age of each individual in the group), or similar or combinations of thereof.

In some embodiments, an online community which is organized as groups of individuals, which is coupled to a mechanism whereby each individual user can create and/or join and become a member of one or more groups, of which a particular online group profile is automatically generated through a mechanism of collecting individuals information from their individual social media accounts (including but not limited to: Facebook accounts, LinkedIn, SnapChat, etc.

In some embodiments, an online community which is organized as groups of individuals, which is coupled to a mechanism whereby the invention inputs real-time and non-real-time data from a variety of sources, then correlates and ranks supplemental information, based in part on a variety of data inputs, as well as historic and other related data. \

In one embodiment, an online community which is organized as groups of individuals, which is coupled to a mechanism whereby each individual user can create and/or join and become a member of one or more groups, of which the online community couples, displays, matches and filters based on the group's personality profile. Correspondence and matches one of the user's multiple groups is anonymous to the user's other groups. Potential group matches are displayed and organized based on the individual group personality profile and separate from the other user's group personality profiles.

The above embodiments of the present invention may be combined, in one or multiple combinations, as various alternatives and equivalents are possible The above embodiments of the present invention may be in the form of an app, a web-app, a native executable, or other forms, and executed on a mobile device, a mobile phone, or mobile media player, a virtual reality device, a wearable device, a wired device, a wireless device, a tablet, a desktop, a laptop, a virtual machine, online, mobile, a cloud-based device, in 2D, in 3D, and/or similar or combinations of thereof.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A group matching system comprising:
 a group matching apparatus and at least a first instance of a mobile software application installed on a first mobile device,
  wherein the group matching apparatus comprises at least one processor and at least one memory including computer program code, the at least one memory and the computer program code configured to, with the processor, cause the group matching apparatus to at least:
   receive, via a network from the at least one mobile software application, a request event, the request event comprising at least an indication of user profile associated with the first mobile device and an indication of a current personality profile;
   access a database, utilizing the indication of the user profile and the indication of the current personality profile, to determine at least a first group with which the user profile is associated;
   access a second database, utilizing information indicative of the first group to identify a set of one or more candidate groups with which to match the first group;
   select a second group, the second group being from the set of one or more candidate groups with which to match the first group;
   transmit information indicative of the second group;
   receive, via the network from the at least one mobile software application, an indication of a type of feedback input at the first mobile device,
   determine a subsequent action as a function of the type of feedback, wherein determination of the subsequent action comprises:
    accessing a third database, utilizing information indicative of the type of feedback;
    and receiving instructions to perform the subsequent action performing the subsequent action,
   wherein the subsequent action is at least one of, in an instance of a first type of feedback, selecting a third group from the set of one or more candidate groups; or in an instance of a second type of feedback, facilitating an interaction with the second group;
  wherein the at least one mobile software application comprises:
   an interface configured to display a first element identifying the second group, a second element the second element being user-selectable and configured to receive input indicative of the feedback:
  wherein the at least one mobile software application comprising computer program code configured to cause the first mobile device to:
   display, on the interface, information indicative of a candidate group;
   receive, from the interface, the input of the feedback; and
   cause transmission of the indication of the feedback.

2. The group matching system of claim 1, wherein the at least one memory and the computer program code are further configured to, with the processor, cause the apparatus to:
 access the second database to identify information indicative of associated display information; and
 cause display of the information.

3. The group matching system of claim 1, wherein the at least one memory and the computer program code are further configured to, with the processor, cause the apparatus to:
 log the type of feedback that the candidate group received by updating the group database to associate the type of feedback data with the second group.

4. The group matching system of claim 1, wherein the at least one memory and the computer program code are further configured to, with the processor, cause the apparatus to:
 receive, in conjunction with the indication of the user profile, an indication of a current personality profile; and
 determine, as function of both the indication of the user profile and the indication of the current personality profile, the at least first group with which the user profile is associated.

5. The group matching system of claim 1, wherein the at least one memory and the computer program code are further configured to, with the processor, cause the apparatus to:
 receive, in conjunction with the indication of the user profile, geolocation data indicating a location of the first mobile device; and
 transmit, via the network to the mobile software application and in conjunction with information indicative of the second group, geo-skin data configured to be displayed on the interface of the mobile software application and identify the location of the first mobile device.

6. The group matching system of claim 1, wherein the at least one memory and the computer program code are further configured to, with the processor, cause the apparatus to:
 determine a current geolocation, of the first group; and
 select the second group is based on proximity.

7. The group matching system of claim 1, wherein selecting the second group comprises:
 identifying, via a learning model, which subset of groups is relevant at a time of the request; and
 determining the second group by closest distance.

8. A method for programmatically performing group matching and facilitating subsequent interaction, the method comprising:
 receiving, via a network from an instance of a mobile software application installed on a first mobile device, a request event, the request event comprising at least an indication of user profile associated with the first mobile device;

accessing a user-to-group database, utilizing the indication of the user profile, to determine at least a first group with which the user profile is associated;

accessing a second database, utilizing information indicative of the first group to identify a set of one or more candidate groups with which to match the first group;

selecting a second group, the second group being from the set of one or more candidate groups with which to match the first group;

transmitting, via the network to the mobile software application, information indicative of the second group, the information indicative of the second group configured for display, at the first mobile device, of a first element identifying the second group, a second element, the second element being user-selectable and configured to receive input indicative of feedback;

receiving, via the network from the mobile software application, an indication of a type of feedback input at the first mobile device, determining a subsequent action as a function of the type of feedback, wherein determination of the subsequent action comprises:

accessing a third database, utilizing information indicative of the type of feedback; and receiving instructions to perform the subsequent action performing the subsequent action, wherein the subsequent action is at least one of, in an instance of a first type of feedback, selecting a third group from the set of one or more candidate groups; or in an instance of a second type of feedback, facilitating an interaction with the second group.

9. The method of claim 8, further comprising:

accessing the second database to identify information indicative of associated display information; and causing display of the information.

10. The method of claim 8, further comprising:

logging the type of feedback that the candidate group received by updating the group database to associate the type of feedback data with the second group.

11. The method of claim 8, further comprising:

receiving, in conjunction with the indication of the user profile, an indication of a current personality profile; and determining, as function of both the indication of the user profile and the indication of the current personality profile, the at least first group with which the user profile is associated.

12. The method of claim 8, further comprising: receiving, in conjunction with the indication of the user profile, geo-location data indicating a location of the first mobile device; and transmitting, via the network to the mobile software application and in conjunction with information indicative of the second group, geo-skin data configured to be displayed on the interface of the mobile software application and identify the location of the first mobile device.

13. The method of claim 8, further comprising:

determining a current geolocation, of the first group; and selecting the second group is based on proximity.

14. The method of claim 8, wherein selecting the second group comprises:

identifying, via a learning model, which subset of groups is relevant at a time of the request; and determining the second group by closest distance.

15. A computer program product for programmatically performing group matching and facilitating subsequent interaction, the computer program product comprising at least one non-transitory computer-readable storage medium having computer-executable program code instructions stored therein, the computer-executable program code instructions comprising program code instructions that, when executed by one or more processors, cause the following operations:

receiving, via a network from an instance of a mobile software application installed on a first mobile device, a request event, the request event comprising at least an indication of user profile associated with the first mobile device;

accessing a user-to-group database, utilizing the indication of the user profile, to determine at least a first group with which the user profile is associated;

accessing a second database, utilizing information indicative of the first group to identify a set of one or more candidate groups with which to match the first group;

selecting a second group, the second group being from the set of one or more candidate groups with which to match the first group;

transmitting, via the network to the mobile software application, information indicative of the second group, the information indicative of the second group configured for display, at the first mobile device, of a first element identifying the second group, a second element, the second element being user-selectable and configured to receive input indicative of feedback;

receiving, via the network from the mobile software application, an indication of a type of feedback input at the first mobile device, determining a subsequent action as a function of the type of feedback;

wherein determination of the subsequent action comprises:

accessing a third database, utilizing information indicative of the type of feedback; and receiving instructions to perform the subsequent action performing the subsequent action, wherein the subsequent action is at least one of, in an instance of a first type of feedback, selecting a third group from the set of one or more candidate groups; or in an instance of a second type of feedback, facilitating an interaction with the second group.

16. The computer program product of claim 15, wherein the computer-executable program code instructions further comprise program code instructions that, when executed by one or more processors, cause the following operations:

accessing the second database to identify information indicative of associated display information; and causing display of the information.

17. The computer program product of claim 15, wherein the computer-executable program code instructions further comprise program code instructions that, when executed by one or more processors, cause the following operations:

logging the type of feedback that the candidate group received by updating the group database to associate the type of feedback data with the second group.

18. The computer program product of claim 15, wherein the computer-executable program code instructions further comprise program code instructions that, when executed by one or more processors, cause the following operations:

receiving, in conjunction with the indication of the user profile, an indication of a current personality profile; and determining, as function of both the indication of the user profile and the indication of the current personality profile, the at least first group with which the user profile is associated.

19. The computer program product of claim 15, wherein the computer-executable program code instructions further comprise program code instructions that, when executed by one or more processors, cause the following operations:
receiving, in conjunction with the indication of the user profile, geolocation data indicating a location of the first mobile device; and
transmitting, via the network to the mobile software application and in conjunction with information indicative of the second group, geo-skin data configured to be displayed on the interface of the mobile software application and identify the location of the first mobile device.

20. The computer program product of claim 15, wherein the computer-executable program code instructions further comprise program code instructions that, when executed by one or more processors, cause the following operations:
determining a current geolocation, of the first group; and
selecting the second group is based on proximity.

21. The computer program product of claim 15, wherein the program code instructions that, when executed by one or more processors, cause selecting the second group further comprises program code instructions that, when executed by one or more processors, cause the following operations:
identifying, via a learning model, which subset of groups is relevant at a time of the request; and
determining the second group by closest distance.

* * * * *